Figure 1:
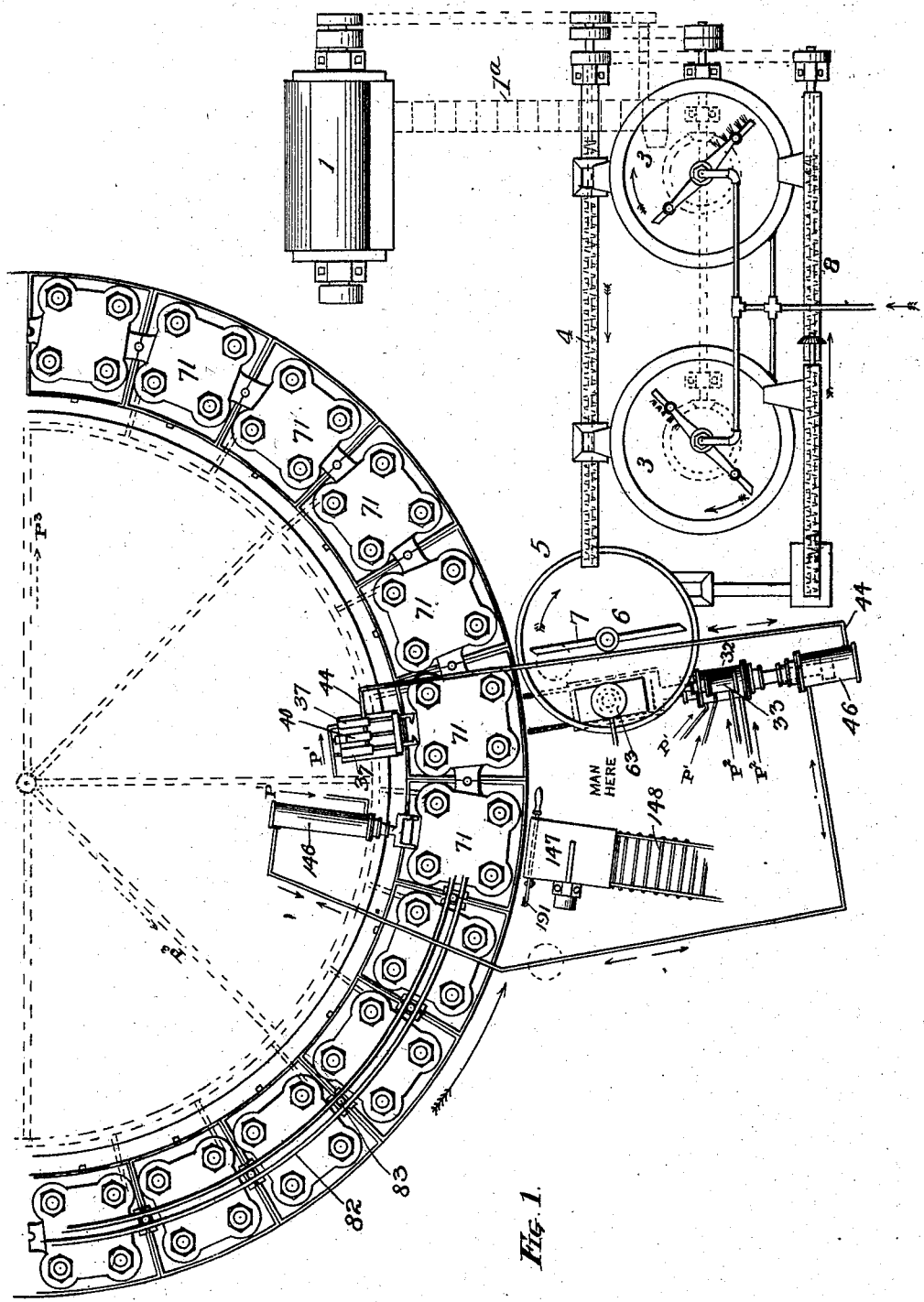

No. 720,532. PATENTED FEB. 10, 1903.
A. B. LAWTHER.
APPARATUS FOR AUTOMATICALLY EXTRACTING OIL FROM SEEDS.
APPLICATION FILED NOV. 15, 1901.
NO MODEL. 17 SHEETS—SHEET 1.

WITNESSES: INVENTOR.
A. B. Lawther.
BY
Munday, Evarts & Adcock.
ATTORNEYS

No. 720,532. PATENTED FEB. 10, 1903.
A. B. LAWTHER.
APPARATUS FOR AUTOMATICALLY EXTRACTING OIL FROM SEEDS.
APPLICATION FILED NOV. 15, 1901.
NO MODEL. 17 SHEETS—SHEET 2.

WITNESSES:
F. B. Townsend
A. W. Munday

INVENTOR.
A. B. Lawther.
BY
Munday, Evarts & Adcock.
ATTORNEYS.

No. 720,532. PATENTED FEB. 10, 1903.
A. B. LAWTHER.
APPARATUS FOR AUTOMATICALLY EXTRACTING OIL FROM SEEDS.
APPLICATION FILED NOV. 15, 1901.
NO MODEL. 17 SHEETS—SHEET 3.

WITNESSES: INVENTOR.
A. B. Lawther.
BY
Munday, Evarts & Adcock
ATTORNEYS

No. 720,532. PATENTED FEB. 10, 1903.
A. B. LAWTHER.
APPARATUS FOR AUTOMATICALLY EXTRACTING OIL FROM SEEDS.
APPLICATION FILED NOV. 15, 1901.
NO MODEL. 17 SHEETS—SHEET 4.

WITNESSES:
INVENTOR.
A. B. Lawther
BY
Munday, Evarts & Adcock
ATTORNEYS

No. 720,532.
PATENTED FEB. 10, 1903.
A. B. LAWTHER.
APPARATUS FOR AUTOMATICALLY EXTRACTING OIL FROM SEEDS.
APPLICATION FILED NOV. 15, 1901.
NO MODEL.
17 SHEETS—SHEET 5.
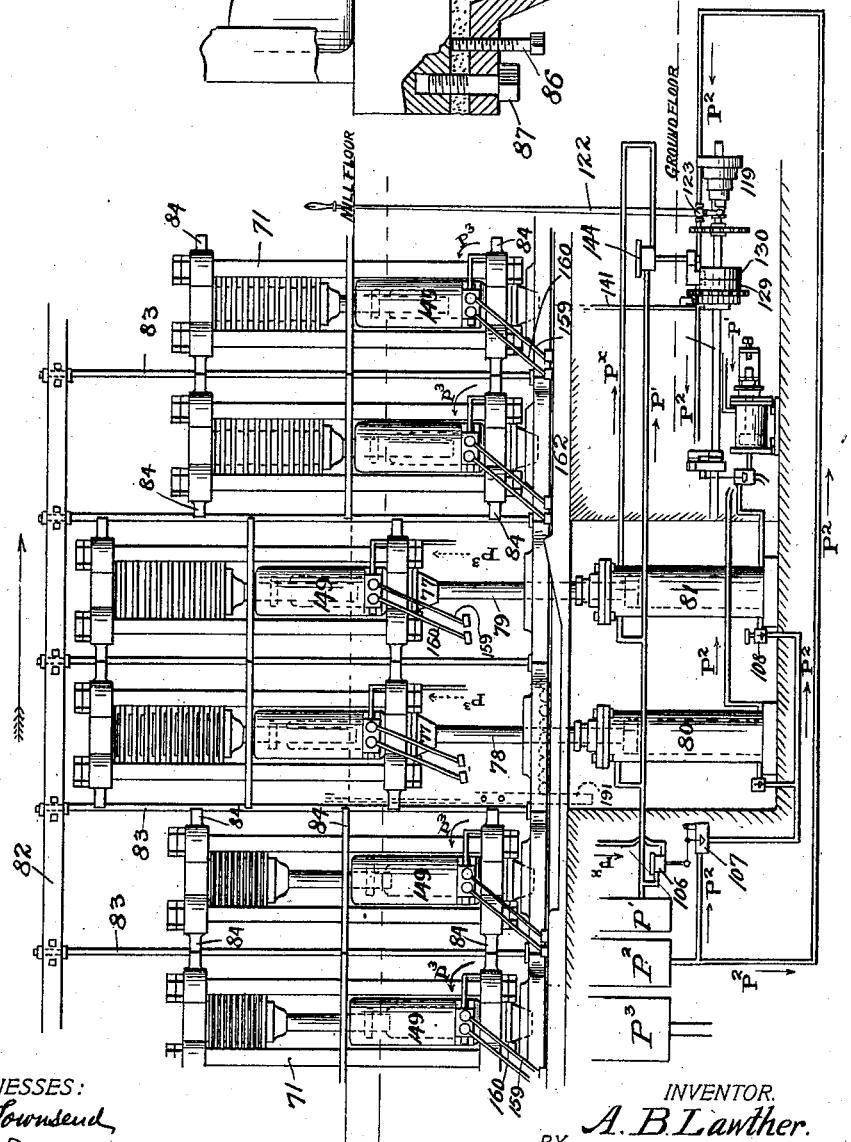
WITNESSES:
INVENTOR.
A. B. Lawther.
BY
Munday, Evarts & Adcock
ATTORNEYS

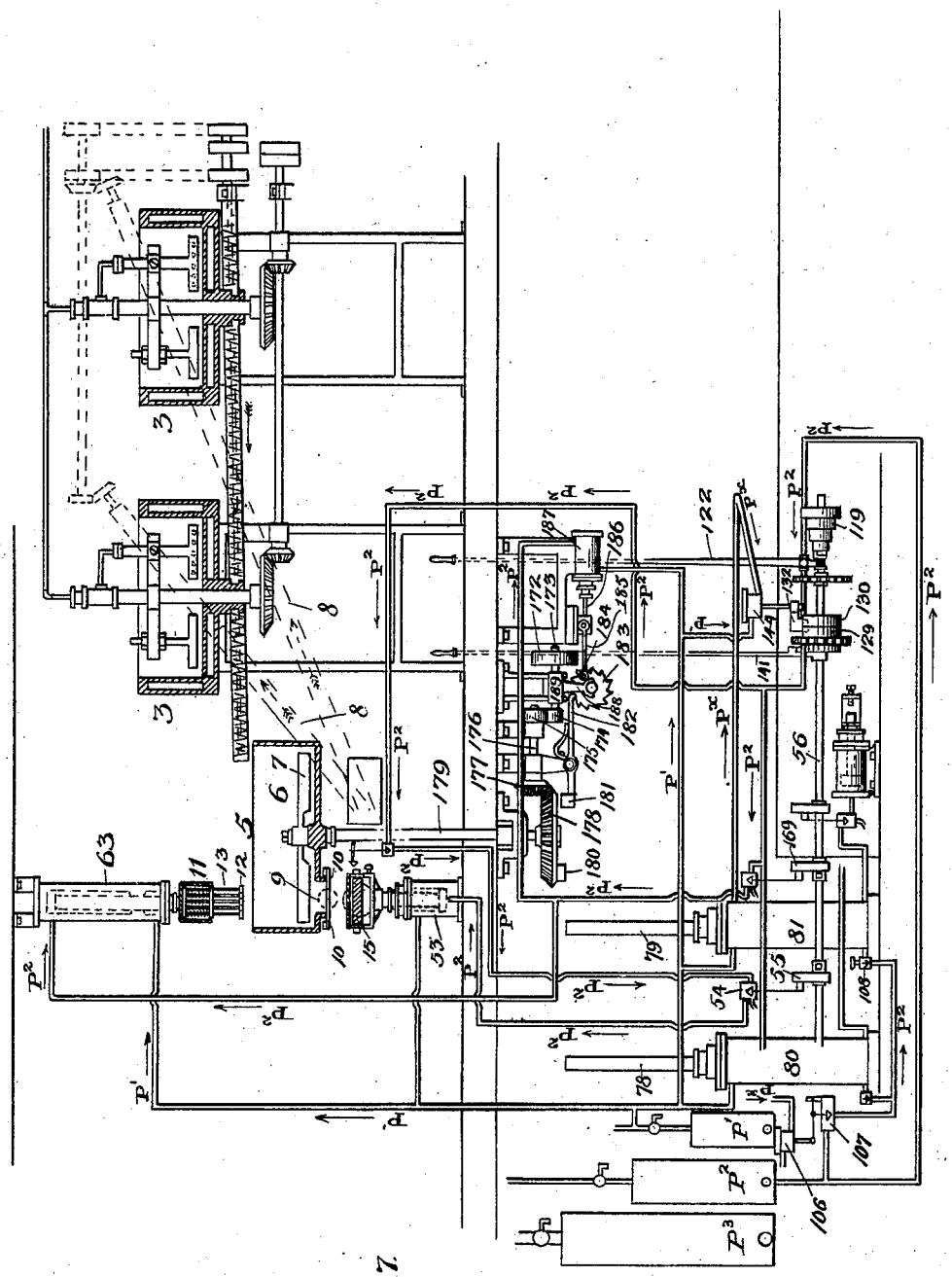

No. 720,532. PATENTED FEB. 10, 1903.
A. B. LAWTHER.
APPARATUS FOR AUTOMATICALLY EXTRACTING OIL FROM SEEDS.
APPLICATION FILED NOV. 15, 1901.
NO MODEL. 17 SHEETS—SHEET 7.

WITNESSES:
F. B. Townsend
INVENTOR.
A. B. Lawther.
BY
Munday, Evarts & Adcock,
ATTORNEYS.

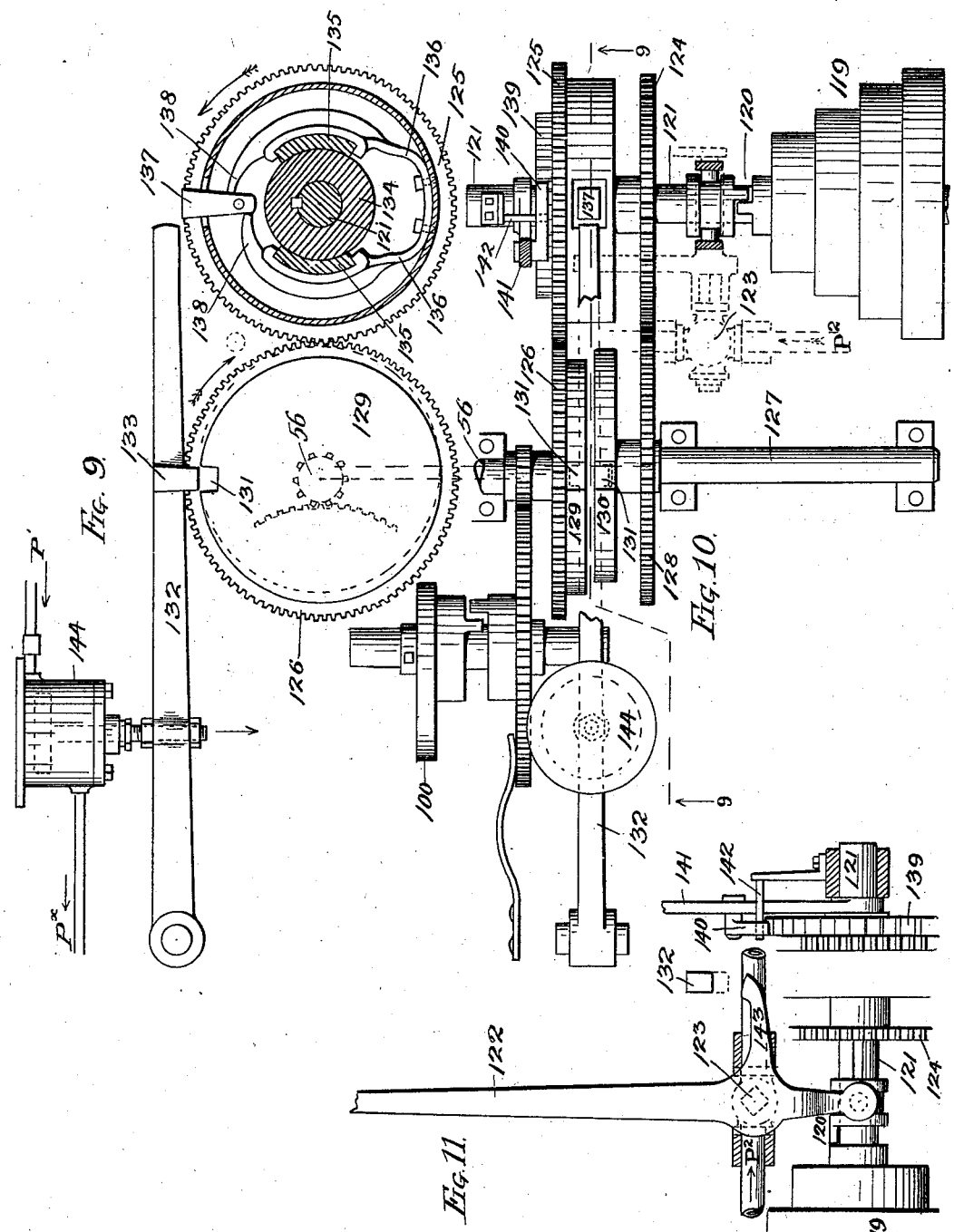

No. 720,532. PATENTED FEB. 10, 1903.
A. B. LAWTHER.
APPARATUS FOR AUTOMATICALLY EXTRACTING OIL FROM SEEDS.
APPLICATION FILED NOV. 15, 1901.
NO MODEL. 17 SHEETS—SHEET 9.
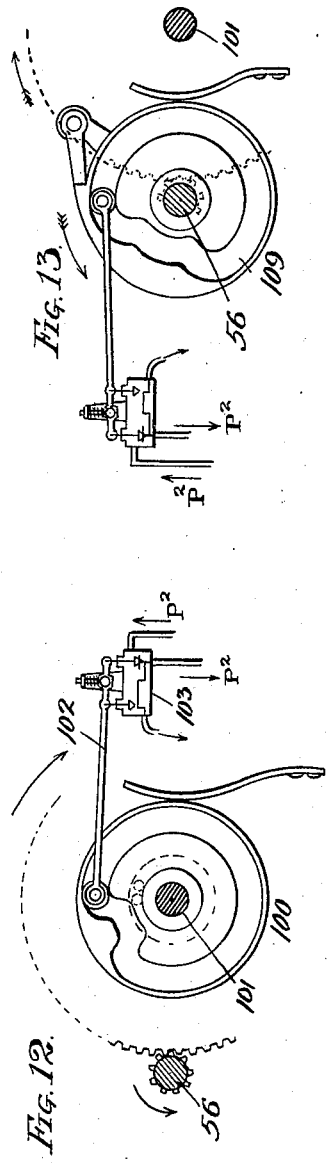
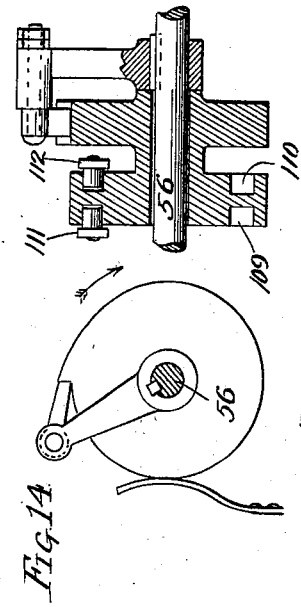
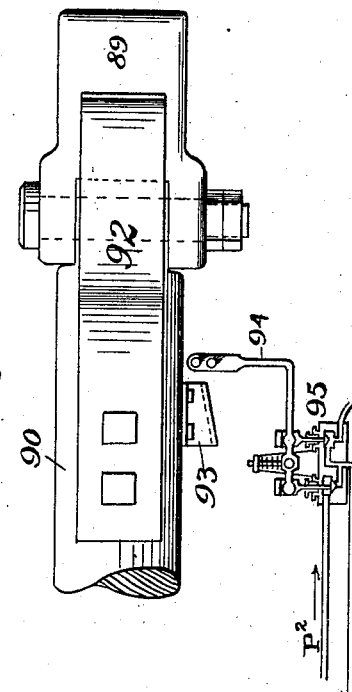
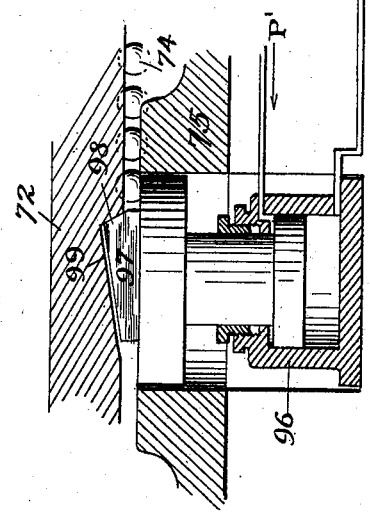
WITNESSES:
F. B. Townsend,
INVENTOR.
A. B. Lawther.
BY Munday, Evarts & Adcock.
ATTORNEYS

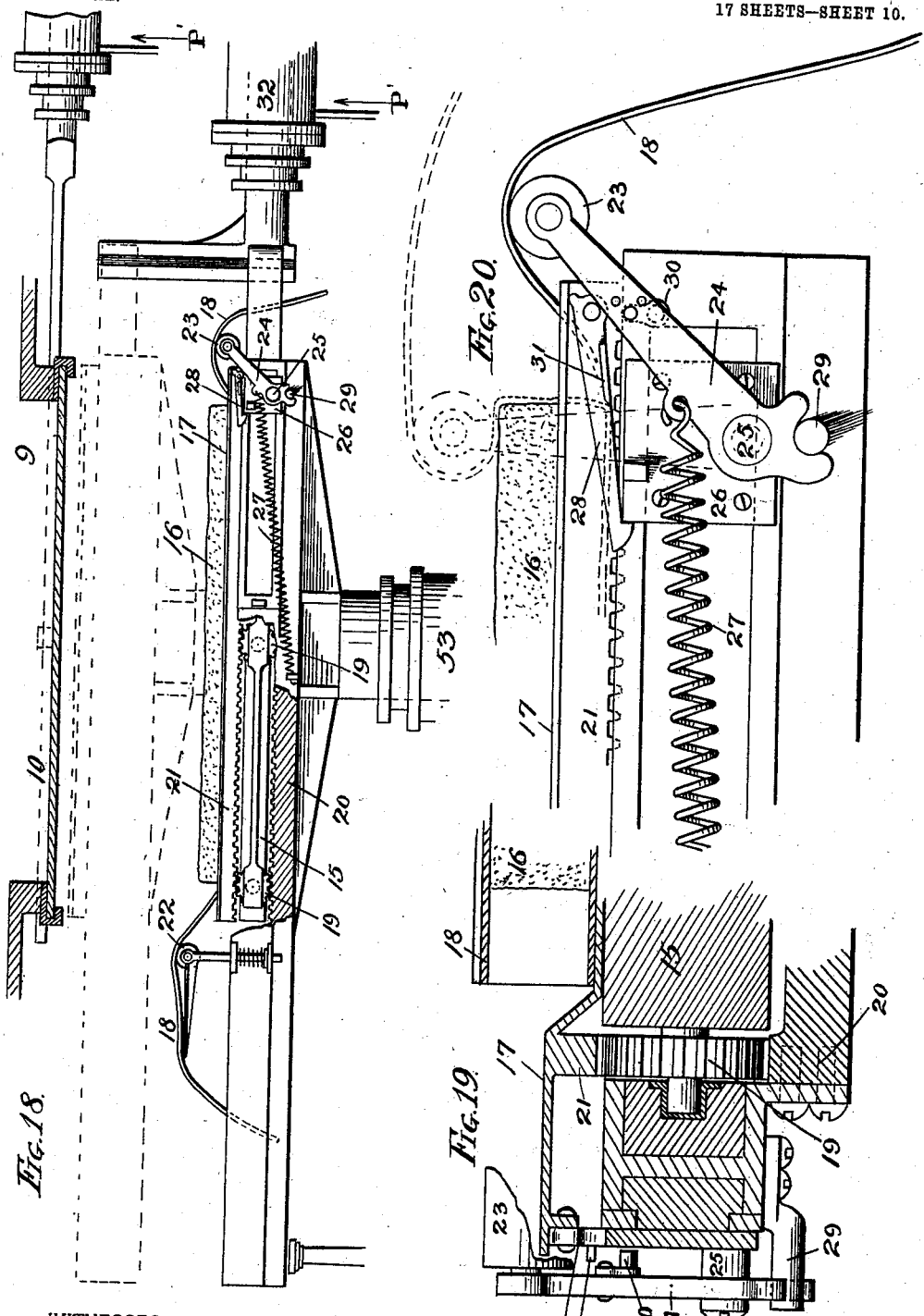

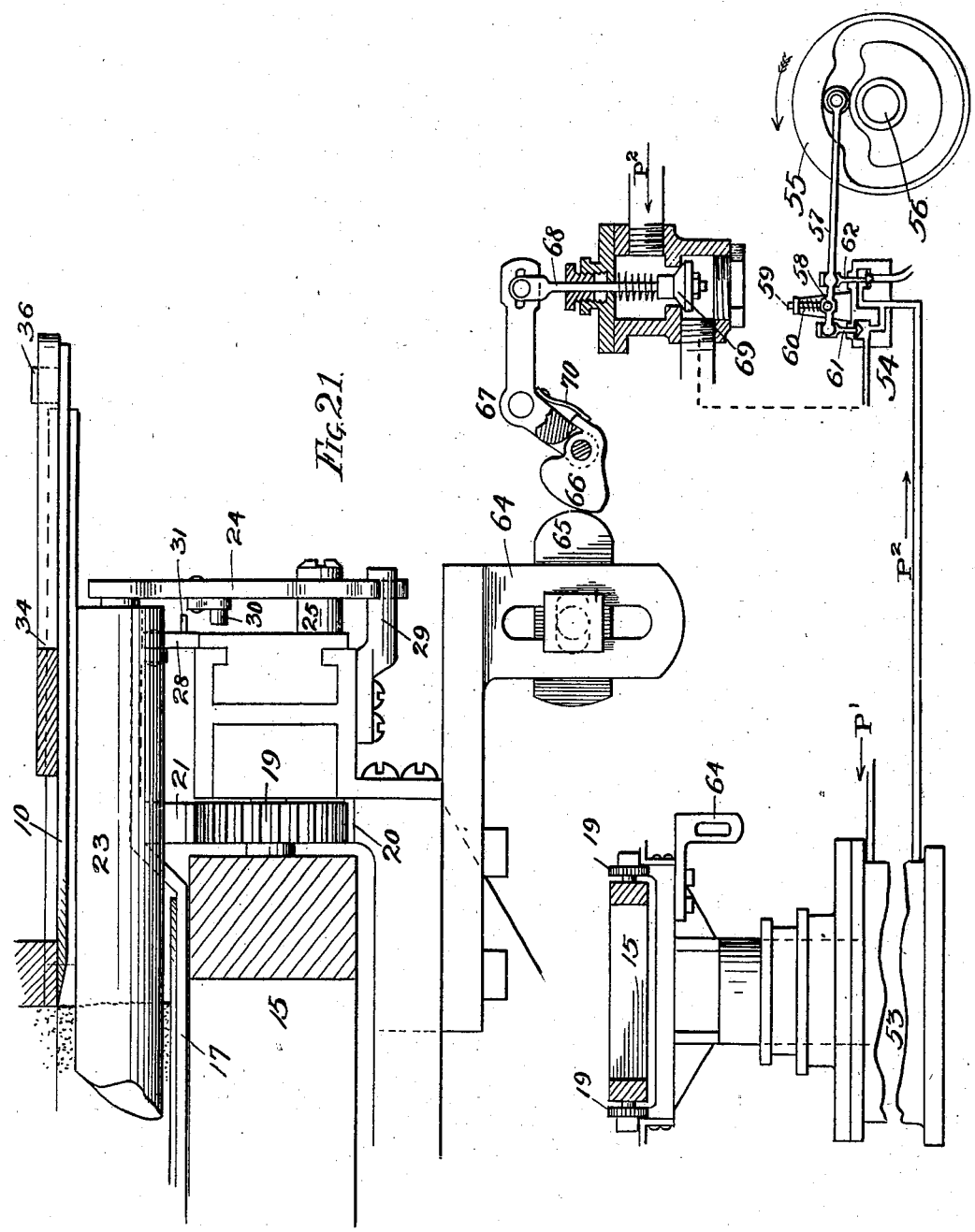

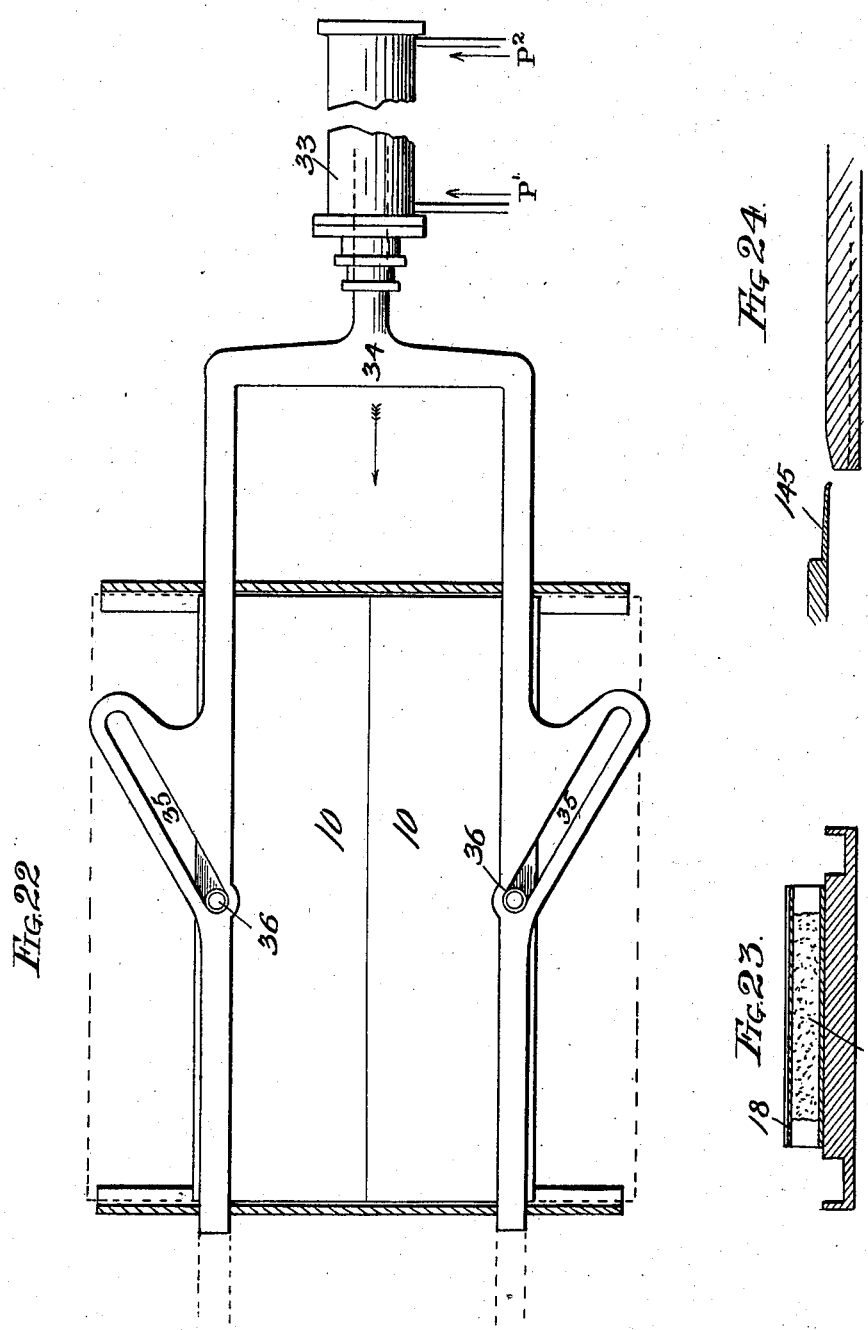

No. 720,532. PATENTED FEB. 10, 1903.
A. B. LAWTHER.
APPARATUS FOR AUTOMATICALLY EXTRACTING OIL FROM SEEDS.
APPLICATION FILED NOV. 15, 1901.
NO MODEL.
17 SHEETS—SHEET 13
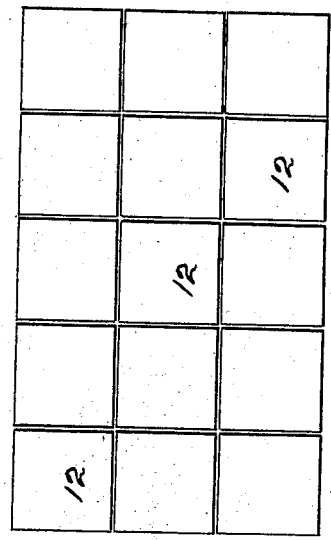
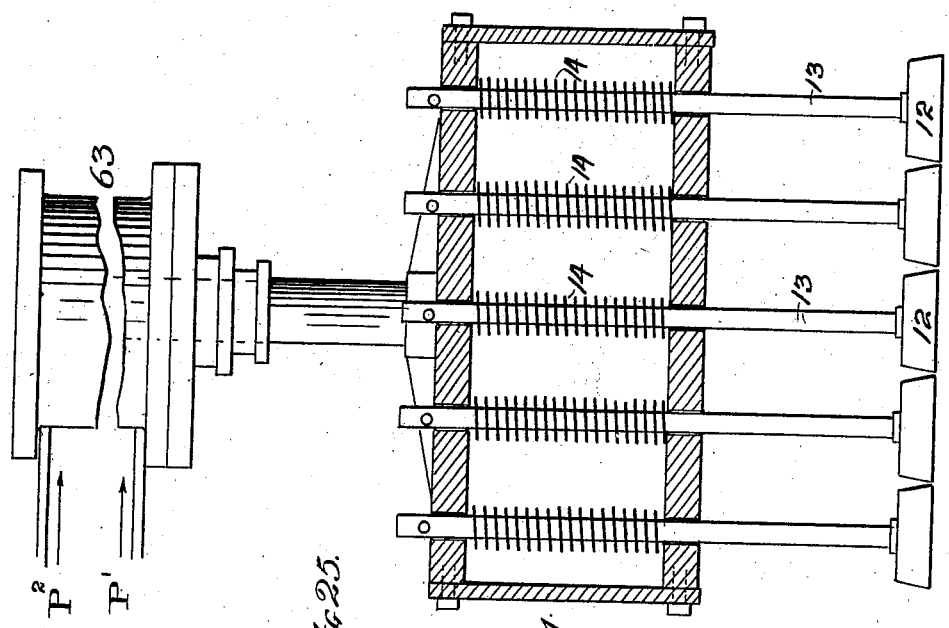
WITNESSES:
F. B. Townsend
INVENTOR.
A. B. Lawther.
BY Munday, Evarts & Adcock
ATTORNEYS No. 720,532. PATENTED FEB. 10, 1903.
A. B. LAWTHER.
APPARATUS FOR AUTOMATICALLY EXTRACTING OIL FROM SEEDS.
APPLICATION FILED NOV. 15, 1901.
NO MODEL. 17 SHEETS—SHEET 14.
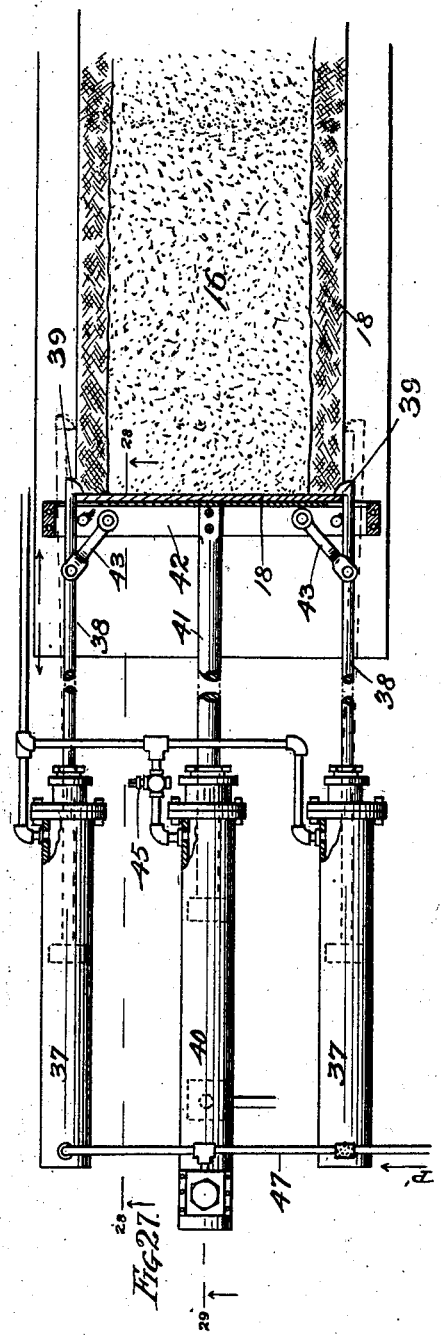
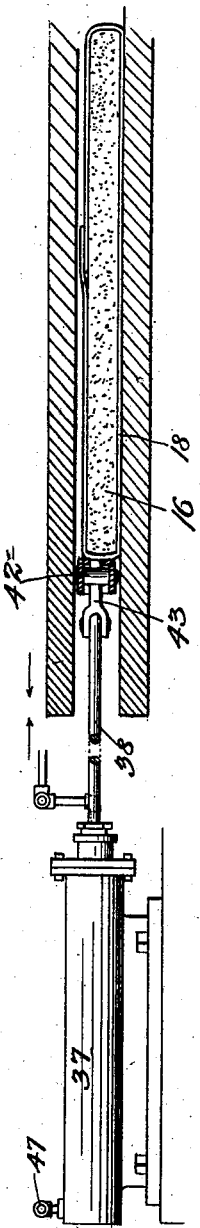
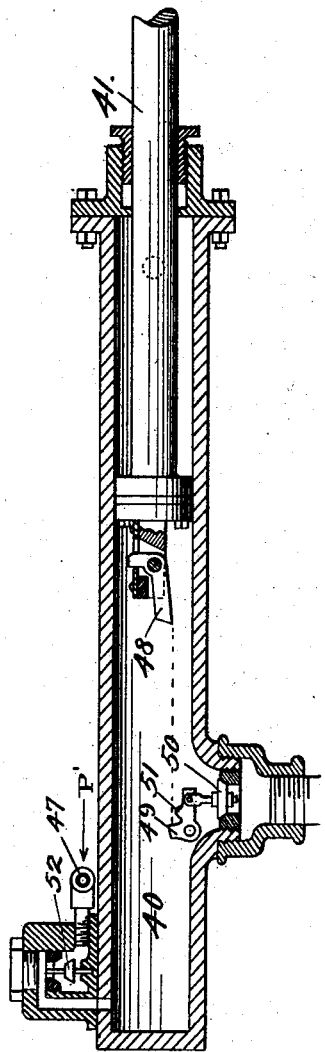
WITNESSES:
INVENTOR.
A. B. Lawther
BY
Munday, Evarts & Adcock
ATTORNEYS No. 720,532. PATENTED FEB. 10, 1903.
A. B. LAWTHER.
APPARATUS FOR AUTOMATICALLY EXTRACTING OIL FROM SEEDS.
APPLICATION FILED NOV. 15, 1901.
NO MODEL.
17 SHEETS—SHEET 15.
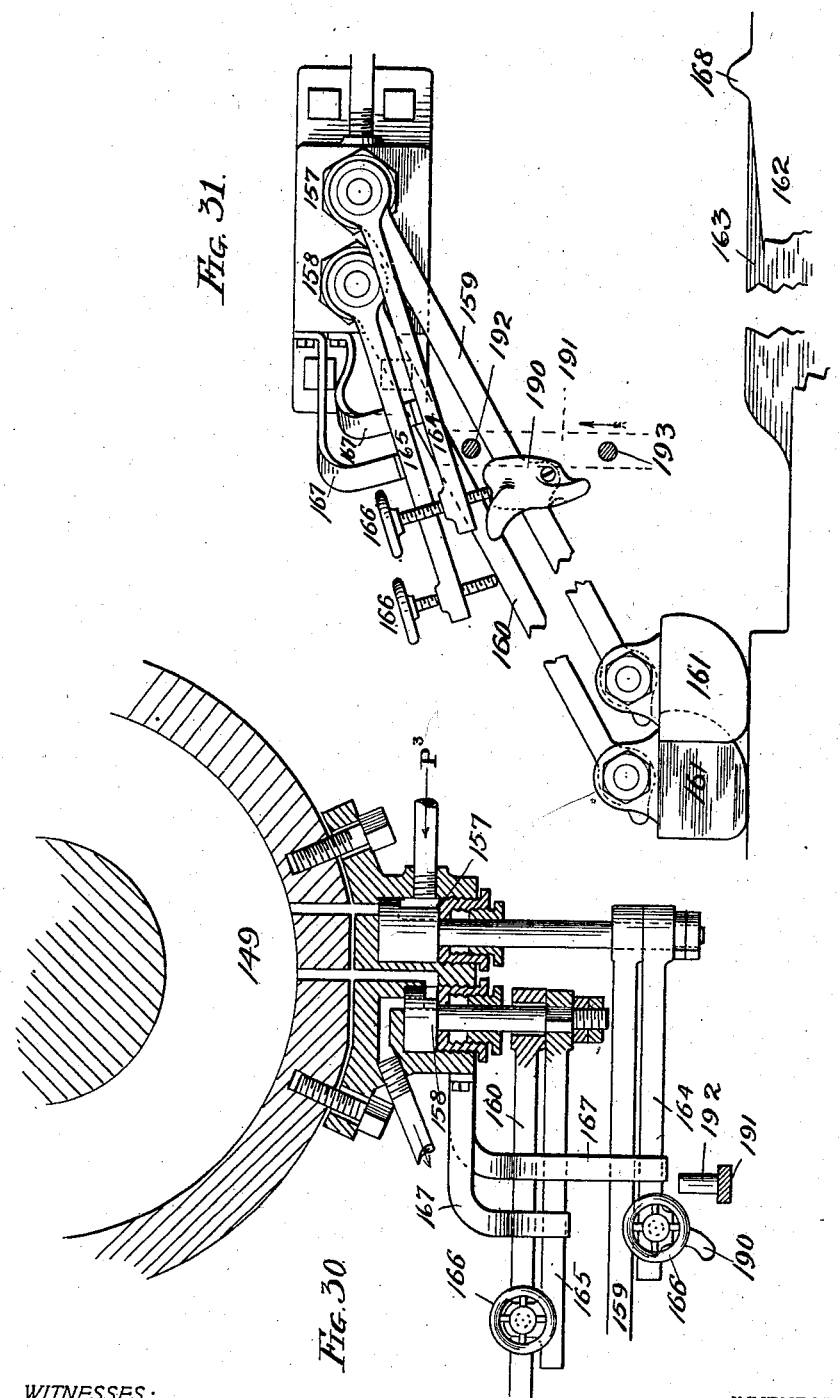
WITNESSES:
F. B. Townsend
INVENTOR.
A. B. Lawther
BY Munday, Evarts & Adcock
ATTORNEYS No. 720,532. PATENTED FEB. 10, 1903.
A. B. LAWTHER.
APPARATUS FOR AUTOMATICALLY EXTRACTING OIL FROM SEEDS.
APPLICATION FILED NOV. 15, 1901.
NO MODEL. 17 SHEETS—SHEET 16.
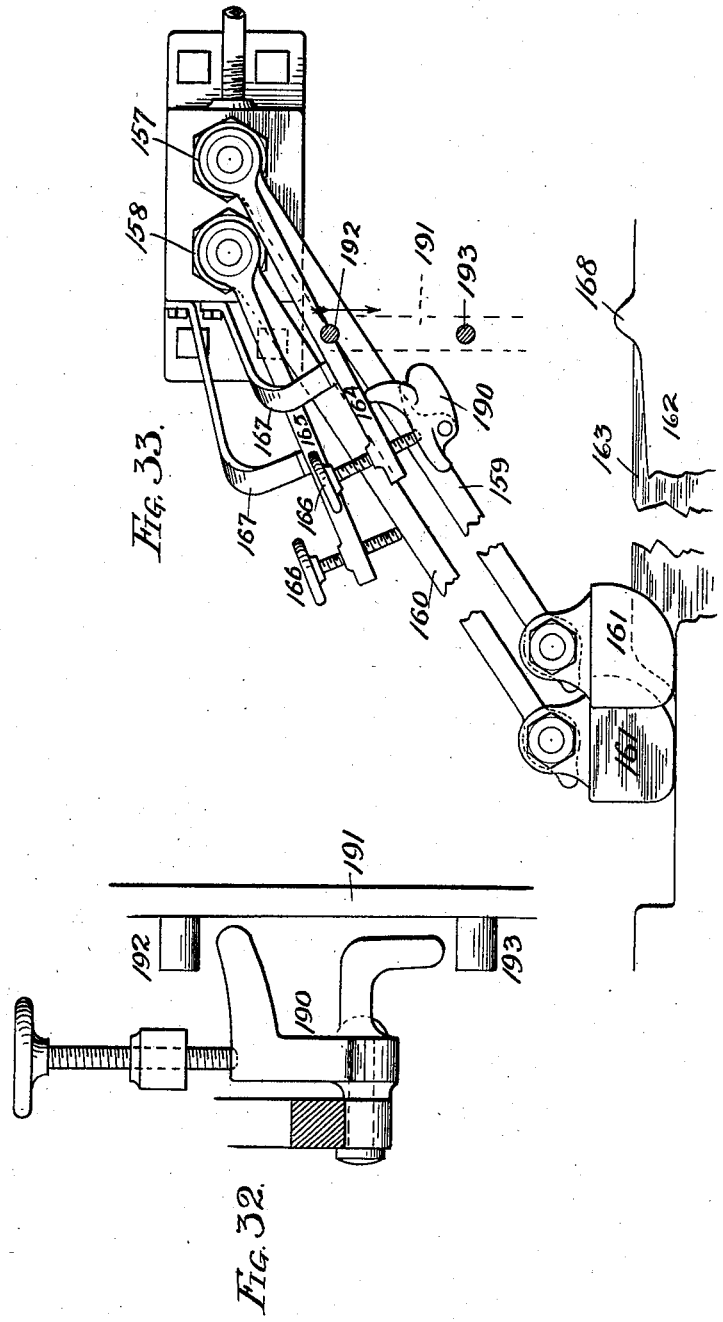
WITNESSES:
F. B. Townsend
N. W. Munday
INVENTOR.
A. B. Lawther.
BY Munday, Evarts & Adcock.
ATTORNEYS No. 720,532. PATENTED FEB. 10, 1903.
A. B. LAWTHER.
APPARATUS FOR AUTOMATICALLY EXTRACTING OIL FROM SEEDS.
APPLICATION FILED NOV. 15, 1901.
NO MODEL.
17 SHEETS—SHEET 17.
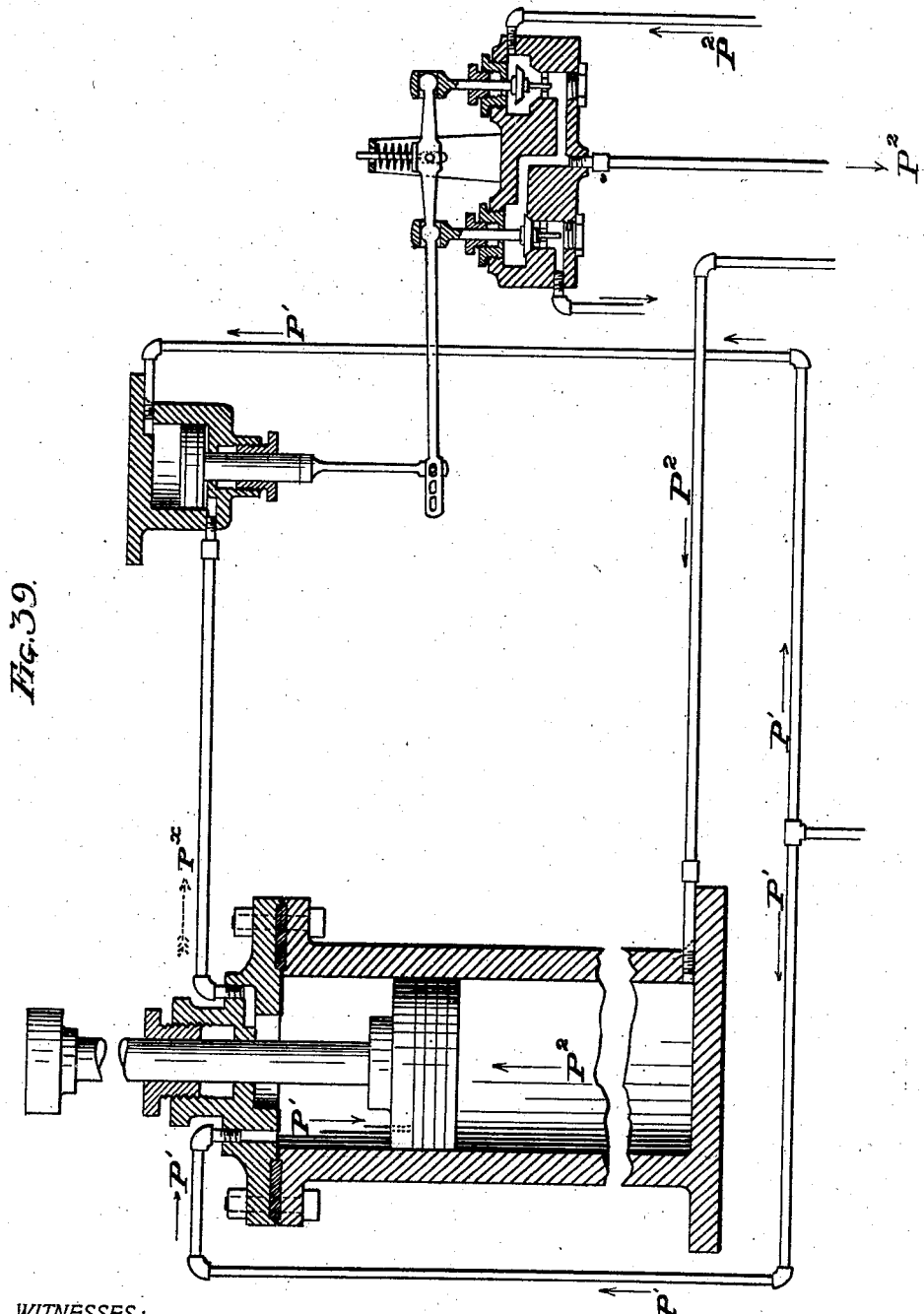
WITNESSES:
F. B. Townsend
INVENTOR.
A. B. Lawther
BY
Munday, Evarts & Adcock
ATTORNEYS

UNITED STATES PATENT OFFICE.

ALFRED B. LAWTHER, OF SYRACUSE, NEW YORK, ASSIGNOR TO FREDERICK O. SWANNELL, OF CHICAGO, ILLINOIS.

APPARATUS FOR AUTOMATICALLY EXTRACTING OIL FROM SEEDS.

SPECIFICATION forming part of Letters Patent No. 720,532, dated February 10, 1903.

Application filed November 15, 1901. Serial No. 82,469. (No model.)

*To all whom it may concern:*

Be it known that I, ALFRED B. LAWTHER, a citizen of the United States, residing in Syracuse, in the county of Onondaga and State of New York, have invented a new and useful Improvement in Apparatus for Automatically Extracting Oil from Seeds, of which the following is a specification.

This invention relates to apparatus for extracting oil from seeds after the same have been crushed in the usual manner.

In the ordinary process of extracting oil from seeds—as, for example, linseed-oil from flaxseed—as at present practiced the flaxseed being properly cleaned is first crushed between rollers until the seed is transformed into meal. The meal is then heated and moistened by stirring it in a heated kettle. The heated and moistened meal is next formed into a flat oblong cake, usually three inches in thickness and thirteen by thirty-two inches in area. A cloth is wrapped around this cake under the bottom of the cake, with the ends brought up around the ends of the cake and overlapping each other on top of the cake, the material of this preparatory cake having been usually solidified to some extent by the operator in order to form it and facilitate its handling and for the reduction of its bulk. The cake being thus formed and wrapped in cloth is placed in one of the compartments of a multiple-chamber hydraulic press, the hydraulic apparatus of which press commonly uses as a liquid in its operation some of the oil which is being manufactured, because oil is a better material than water for this purpose, and the oil being identical with the product of the press leakage will do no harm by mixture therewith. The power being applied to the press, the platen continues to rise, closing up the chambers and pressing the oil from the cake until it has forced out all that it is practical to extract. The time employed for the pressing varies somewhat in different mills; but the better practice indicates that the cake should remain in the press under pressure for about fifty minutes, and allowing ten minutes for filling the press, &c., this gives about one pressing to the hour for each press, and two men are able to handle from five to seven presses. This process now in universal use for many years is the one described in my Patent No. 168,164, dated September 28, 1875, in general terms. Although almost all milling operations in other than oil-mills have become in modern times—as, for example, in flouring-mills—largely automatic, and although owing to the small margin of profit in the manufacture of oil automatic operations in its manufacture have long been sought and desired, owing to the nature of the material to be handled and the ponderous character of the pressing machinery it has been thought by every one, so far as I can learn, impossible to make such a mill automatic, either by carrying the cakes to the presses or by carrying the presses to the cake, and the fact is that a large part of the time of the men employed in an oil-mill during its operation is consumed in carrying the formed cake to the presses, as well as in forming the cake, and until the present invention no attempt has been made to render the operation of such a mill thoroughly automatic.

In the present invention for several reasons, among which may be named the prime difficulty of conveying the formed cake from the place where it is made to the various presses of the mill and the difficulty of delivering such cake to the various chambers of the press, I prefer, notwithstanding the great weight of the presses relative to the small weight of the cake, to bring the presses one after another to the cake-forming apparatus and to lower the presses after lifting to full height, so that chamber after chamber shall come into position to receive the cake from the forming-machine without bodily movement of the latter and to discharge the cake from the presses by a like lowering of the presses step by step. To accomplish this, I provide a stationary heater, a stationary cake-forming machine, to which latter the meal is conveyed from the heater by an ordinary conveyer, and I mount a series of hydraulic presses—say, for example, twenty-four such presses—on a turn-table which moves around on a fixed track with a step-by-step motion, one step for each press, and provide said turn-table with means for raising and lowering the presses bodily with a step-by-step movement corresponding to the distance between the cake-chambers in the press.

When automatic devices are of moderate dimensions, there is ordinarily no great difficulty encountered in constructing rigid framework to carry the usual cams, levers, shafts, gearing, and other mechanical movements commonly employed in such devices; but when the several parts are necessarily much farther apart and some of them very heavy the framing becomes a difficult problem, an expensive thing, and there is a much increased difficulty in subsequent maintenance. It is for this reason that I have preferred to carry out my invention by generally effecting the required movement by means of hydraulic engines operated, preferably, by a liquid consisting of the kind of oil being manufactured in the mill, the flow of the liquid being controlled by valves located at whatever distance desired from the cylinders of the hydraulic engines, connection being made from the several valve-boxes to their respective cylinders by pipes, which in their nature do not require in all parts to be in any exact position, but may run anywhere, and which consequently do not need any special means of support or any exactness of alinement, such as is required by shafting and other mechanical devices. As these pipes may be of ample size and as liquids are practically incompressible, the motions of the pistons follow promptly the movements of their respective valves, and considerable distances, if required, may be covered without the special framing which would be necessary if long rigid elements, such as shafts, &c., were used. The cams, levers, and other mechanical devices which initially operate the valves may themselves be moved from an ordinary steam-engine or prime motor, communicated through the medium of the usual shafting and belting not requiring special construction.

The invention consists in the novel devices and in the novel combinations of parts and devices herein shown and described, and specified more particularly in the claims.

Figure 2:
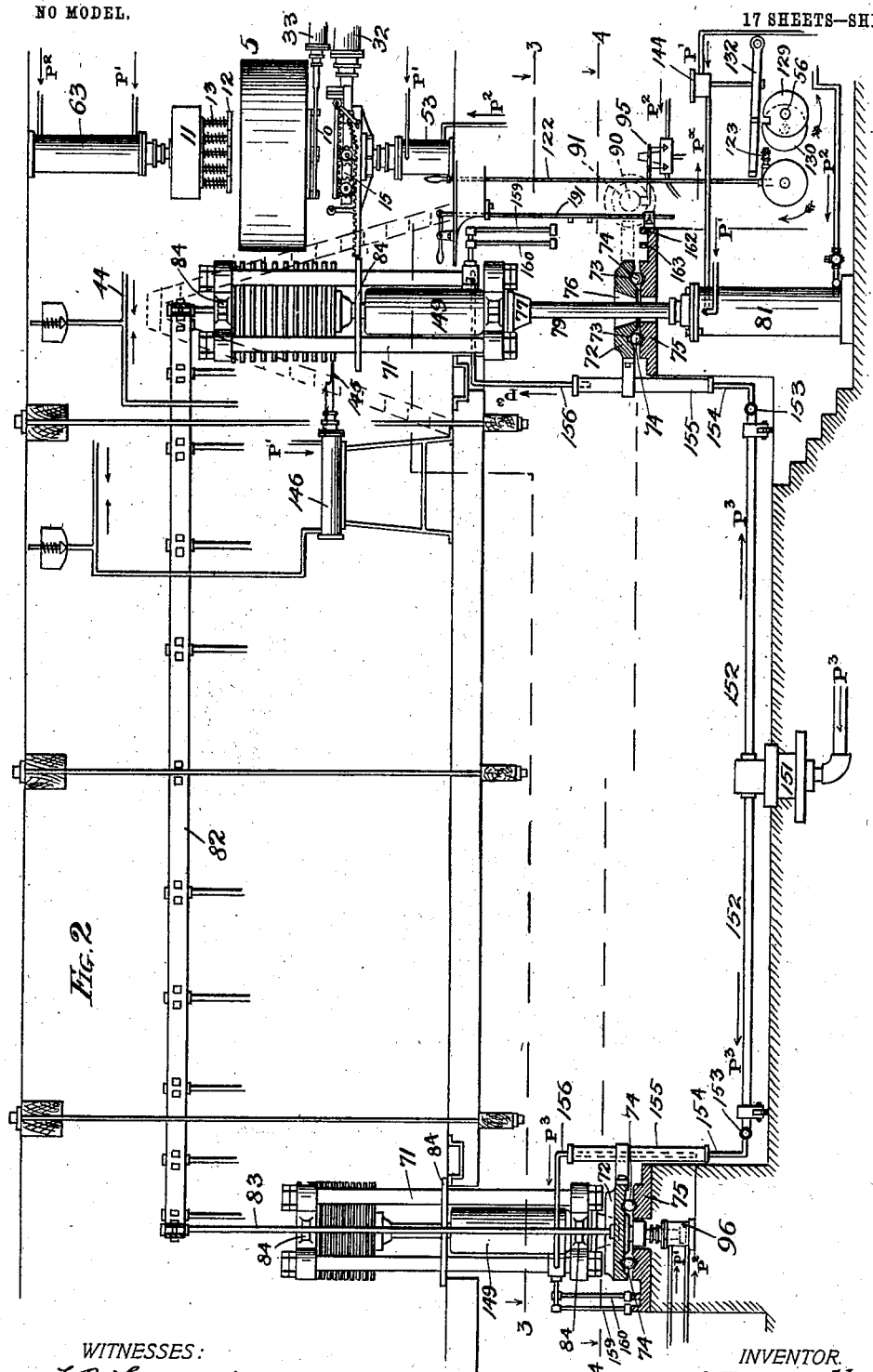
Figure 3:
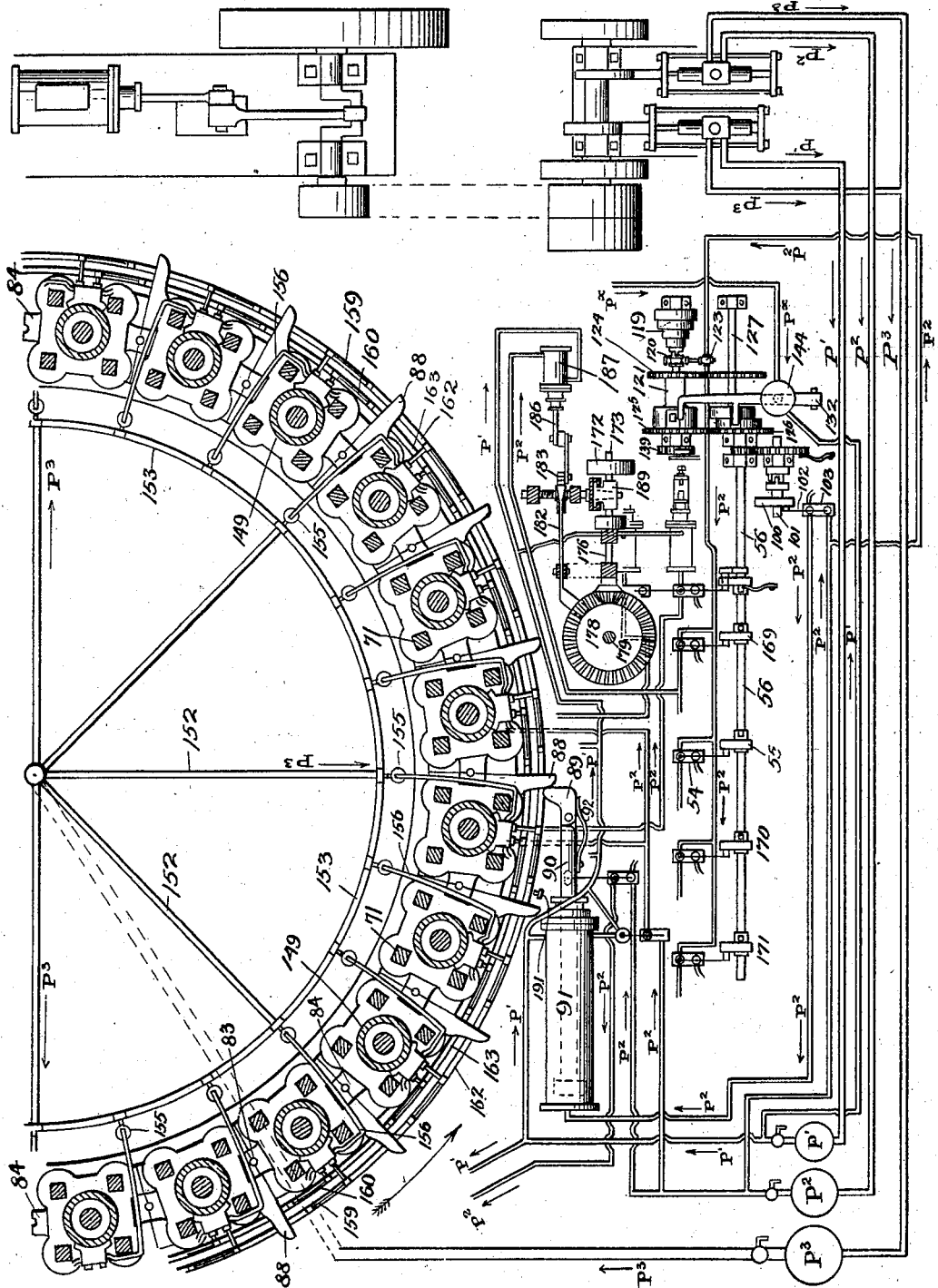
Figure 4:
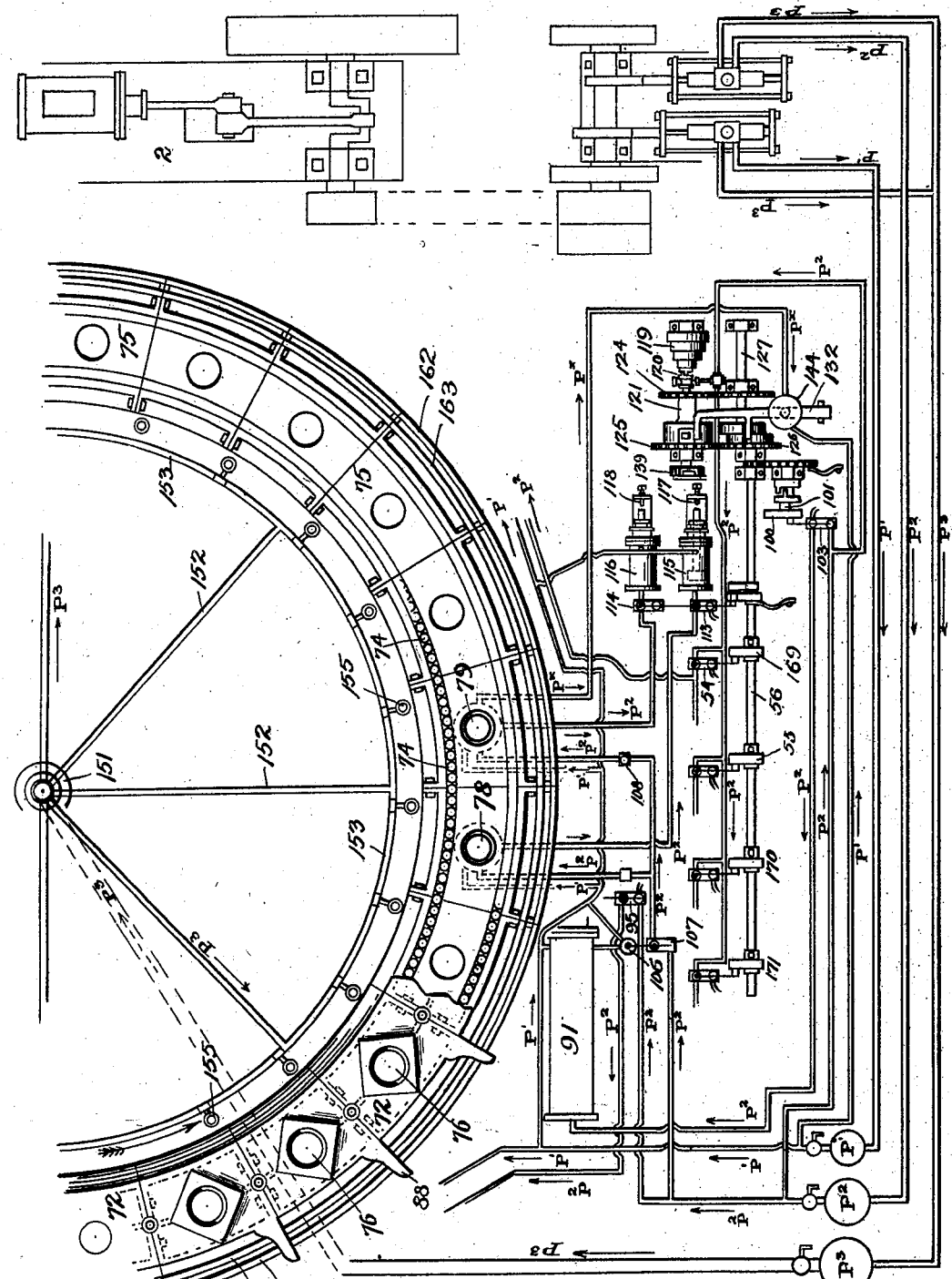
Figure 8:
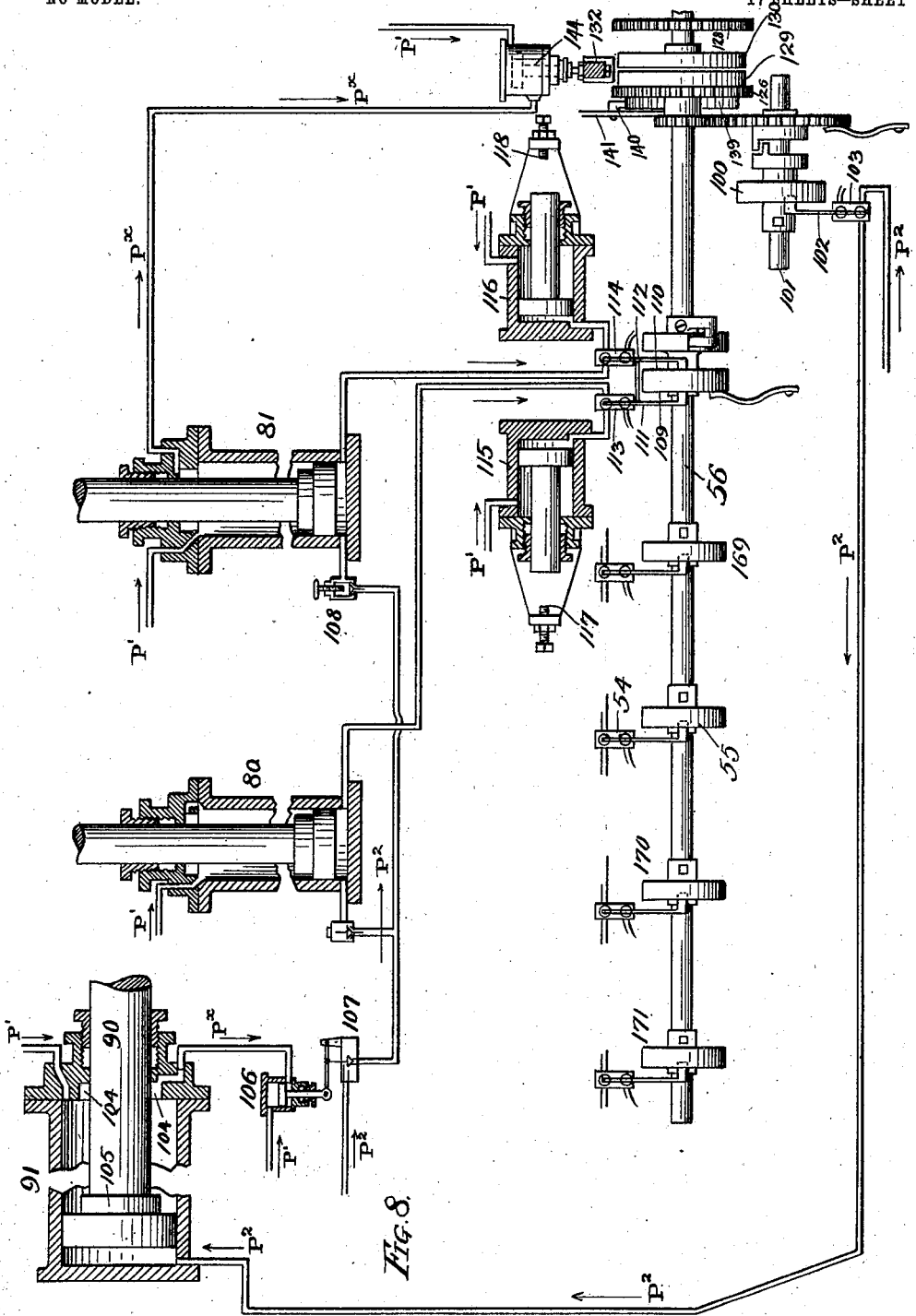

In the accompanying drawings, forming a part of this specification, and in which similar characters indicate like parts throughout the several figures, Figure 1 is a top or plan view of the mill-floor, showing the crushing-rolls for crushing the seed, the heater or heaters for heating the meal, the cake-forming machine, the presses, and the cake-discharging mechanism and the stripping device for stripping the cloth from the pressed cake. Fig. 2 is a central vertical section showing the cake-forming machine, the apparatus for conveying the cake into the press, the presses mounted upon a turn-table, the means for lifting and lowering the presses, and the means for discharging the pressed cake from the press, and the brake-detent apparatus for stopping the turn-table at the required position. Fig. 3 is a horizontal sectional plan showing the prime motor, the pump for operating the hydraulic engine, the accumulators, and sundry pipes and other mechanism. Fig. 4 is a similar view to Fig. 3, but showing some parts concealed in the latter figure. Fig. 5 is a sectional front elevation of a part of the apparatus. Fig. 6 is a detail view upon a larger scale than the previous figures, showing the lower end of the press and the device for leveling the same. Fig. 7 is a sectional elevation of Fig. 1, omitting the presses for sake of clearness. Fig. 8 is an enlarged sectional view of some of the parts shown in the previous figures. Figs. 9, 10, and 11 are enlarged views of portions of the mechanism. Fig. 12 is an enlarged view of the turn-table valve-actuating cam. Fig. 13 is a view of the cam for actuating the valve of the press-lifting cylinder. Fig. 14 is an obverse view of the same, and Fig. 15 is a sectional view thereof. Fig. 16 is a view of the cam which operates the valve for controlling the cylinder that operates the molder-table and cake-former. Fig. 17 is a view of the detent-brake apparatus. Figs. 18, 19, and 20 show the molder-table, the cake-cutter, and the cloth-throwing device for wrapping the cloth on the cake. Fig. 21 shows the apparatus used in connection with the cake-former to determine the thickness of the cake. Fig. 22 shows the cutting-jaws and operating device for cutting off the cake when it is formed. Fig. 23 is a cross-sectional view of a soft cake as it lies in the press on the plate which constitutes the bottom of one of the chambers of the press, and this figure shows the grooves in the plate for carrying off the oil and also the cloth on the cake. Fig. 24 is a sectional view of one of these press-plates (there being no cake present) and a view of the cake-expeller. Fig. 25 is a vertical section of the upper part of the cake-former, and Fig. 26 is a bottom view of said cake-former. Fig. 27 is a plan view of the apparatus for pulling the cake in the press, which is called the "cake-puller." Fig. 28 is a section of Fig. 27 on the line 28 28. Fig. 29 is a vertical section of the center cylinder on the line 29 29 of Fig. 27. Fig. 30 is a horizontal sectional view of the valves for controlling the flow of liquid to and from the hydraulic cylinder of the press. Fig. 31 is a side elevation of the valve-operating levers shown in Fig. 30. Fig. 32 is an end view of one of the levers shown in Fig. 31. Fig. 33 is a view similar to Fig. 31, showing the valve-levers in different positions. Fig. 34 is a face view of the valve-box shown in Fig. 30. Fig. 35 shows the two valve-plugs of said valve; and Figs. 36, 37, and 38 show an outline of the valve-opening when fully closed, partly closed, and fully opened, respectively. Fig. 39 is a sectional view of a hydraulic cylinder—such, for example, as the one which lifts and lowers the presses—and is intended to illustrate a means of actuating valves by this cylinder for controlling or producing a subsequent movement of some other part, so that the required movements will follow in their proper order.

In said drawings, 1 represents a stack of ordinary five-high crushing-rolls such as are used in oil-mills for crushing the seeds and which are driven in the ordinary manner by the belt from the shafting that receives its power from the prime mover of the mill. This prime mover is indicated at 2 in Fig. 3 and is there shown to be a steam-engine. The heater or heaters are of the usual construction, as shown at 3 3, and consist of the customary jacketed cylindrical kettle and revolving stirrer-arms, one of which delivers steam to the meal. This mechanism is also or may be most conveniently driven by the prime mover of the mill through the usual gearing and shafting. The crushed seed is delivered by a conveyer or elevator (not shown in the drawings) from the crushing-rolls to the heaters, which are thus kept at all times properly full. A door or gate in the side of the heater permits the meal to flow over the lip of the gate as the heater fills above a certain point, so that the moistened and heated meal will after remaining the necessary time in the heater be constantly delivered therefrom by this overflow action of the screw conveyer 4, the screw of which is operated from the shafting of the mill. This screw conveyer carries the heated and moistened meal to the forming-machine 5, which consists of the cylindrical tub or vessel 6, containing a pair of revolving arms 7 7, which are caused to continually rotate by means of power derived from the shafting of the mill. This tub may preferably be also provided with an overflow-gate to prevent the meal rising above a certain height therein, said overflow-lip delivering the overflow-meal to the elevators 8 8, which convey it back to the heaters. It will be understood that the initial regulation of the amount of meal delivered to the apparatus should be made by regulating the amount of seed delivered to the crushing-rolls. The small unavoidable variation in the amount delivered from the crushing-rolls will be self-regulated by the return-conveyer above mentioned. Hitherto the usual method of forming the cake preparatory to placing it in the press has been such that cakes of varying density were produced. It is one of the objects of the present mechanism to produce cakes of uniform density and consistency throughout their whole extent, so that the work of the presses will be uniform and the amount of oil left in the different parts of the same cake will be the same. This is an important thing in the millwork, as it enables the operator to determine by proper tests exactly what he is doing at all times, which cannot be done where the different parts of the cake are not uniformly the same.

In the bottom of the meal-tub 6 is the rectangular oblong opening 9, the bottom of which is closed by the cutting-slides 10 10, the means for operating which is presently to be explained. The opening 9 is of the lateral dimensions of the cake, and the meal at the bottom of the tub is forced through this opening by a vertically-descending plunger 11. The head of this plunger is composed of a number of separate heads 12 12, &c., (see Fig. 26,) each of which is mounted upon a separate stem 13, sliding in the plunger-head against the pressure of a spring 14, as will be clearly understood by reference to Fig. 25.

Another important result produced by the sectional yielding head of the plunger in addition to producing a uniform pressure throughout the whole cake and a consequent uniform density of the cake is a great saving in the wear of the press-cloths and also the porous press-mats. If the cake be not of uniform density throughout, the great pressure applied in the presses not being properly distributed tends to cut the fibers of the cloth at the denser portions of the cake and also to cut the mat at these places, which has been an item of very great expense hitherto in oil-mills and which I have by this means almost entirely eliminated, so that the cloths and mats will last a much longer time.

Underneath the meal-tub and under the opening 9 is a table 15, which is vertically movable in a predetermined manner and with a certain power of resistance, as will be subsequently explained. At the proper time the plunger 11 descends upon the meal in the tub and forces a quantity of it down into the opening 9 and through said opening, the sliding gates 10 10 having been withdrawn. At this time the table 15 should be in its uppermost position and in contact or nearly in contact with the bottom of the opening. The plunger 11 forces the meal down against the table 15 with a power sufficient to move said table downward, thus compressing the meal with a pressure which may preferably be in the neighborhood of two hundred and fifty pounds to the square inch, which will not be sufficient to drive the oil out of the cake, but yet sufficient to compress the meal firmly enough. When a sufficient quantity of meal has been extruded upon the table, the downward motion of the table is arrested and the plunger continues to descend to its lower limit, each of the yielding faces accommodating itself to the slight variation in the density of the meal which may lie immediately beneath it, whereby a uniform density is secured throughout the meal. The plunger now begins to return and the cut-off gates close, cutting off the cake from the rest of the meal and closing the bottom of the opening preparatory to another similar operation. The table upon which the cake lies on the press-cloth is now released from this arrest or temporary stoppage and descends to a lowermost position, at which position the cloth is folded over the cake and from whence the cloth-covered cake is delivered to the press.

The cake is shown at 16 in Fig. 18 lying on the pan 17, mounted on said table 15. The cloth 18 is by hand laid on this pan before the cake is extruded thereon, as above described, leaving the ends free and hanging over, ready to be folded over the top of the cake. This latter operation is performed automatically, as will be presently indicated. Both the table and the pan lying thereon are movable horizontally and are so connected that when the table is moved endwise the pan will travel faster than the table, so that it may carry the table and bridge the space between the table and the press to deliver the cake to the press, as the table itself would be too large to enter the chamber in the press. The increased motion of the pan over the motion of the table is produced as follows: The table 15 is provided with cog-wheels 19, which support it upon the stationary rack 20, which in turn is attached to the lifting-head for raising and lowering the table. A similar rack 21, with its teeth pointing in the opposite direction, is attached to the pan, the cog-wheels engaging both racks simultaneously. Now it will be seen that when the table is pushed forward these cog-wheels are rotated and the upper periphery of said cog-wheels imparts an additional motion to the pan, which may be by suitable gearing multiplied to any extent. As shown in the drawings, the pan will move twice as far as the table.

To fold the cloth over the cake, the following mechanism is provided, which is operated by the rectilinear movement of the table and pan: Owing to the motion of the cake, the problem of folding the cloth over the front end of the cake and folding it over the rear end of the cake presents different propositions. To fold the cloth over the front end of the cake, it will be sufficient to lay the cloth over the bar or roller 22, placed in front of the cake and high enough above so that the cake can pass under it, and the operation will be this: The front end of the cake pressing against the cloth will drag the end over the bar or roller as the cake moves forward. The folding of the rear end, on the contrary, by reason of the motion of the cake requires that some moving part shall be provided which shall seize the bight of the cloth and swing the cloth over with a motion more rapid than the motion that the cake has, so that the cloth will overtake the cake and be laid in position prior to the folding down of the front part, above described, to bring the lap at the end of the cloth in the proper direction. The mechanism for folding over the rear end of the cloth consists of a roller 23, engaging the bight of the cloth and mounted on an arm 24. This arm is pivoted by a pivot 25 to a slide 26, mounted to slide in ways on the horizontal head-supporting table. A coiled spring 27 extends from the arm 24 to a point on the stationary head upon which the table rests. Mounted on the pan is a hook-latch 28, which engages the slide 26. The lower end of the arm prolonged beyond the pivot is forked to engage a pin 29 in the stationary head. The operation is as follows: Things being in the condition indicated in Figs. 18, 19, and 20, when the table is pushed forward by the means which moves it the pivot of the arm 24, being attached to the slide, causes the arm 24 to fulcrum on the pin 29, and thus to be rotated up into the position shown in dotted lines in Fig. 20. Although the pan at this time is moving twice as fast as the table, the slide on which the arm is pivoted by reason of the action of the spring still continues to keep in contact with the hook attached to the pan, because the spring 27 pulls the slide forward. As the arm rises, the hanging pin 30, attached to said arm, strikes against the projection 31 on the hook 28 and lifts the hook out of engagement. At this juncture the roller is already on top of the cake-carrying bight of the cloth, and when the hook is released, as above, the spring is permitted to come into free action and carries the slide and the arm together rapidly forward, overtaking the cake and laying the cloth on its surface. The cake then continues its forward movement, passing under this roller 23 and onto the press. When the table and pan return to their starting position, the hook 28 catches the slide 26 and draws it back again until the forked end of the arm 24 encounters the pin 29, when the arm is rotated again in the position shown in full lines in Fig. 20, when the apparatus is ready for another operation.

From the foregoing it is apparent that the horizontal movement imparted to the table 15 being a plain to-and-fro movement is one which can be given at suitable intervals by a hydraulic engine or cylinder, and I employ such a cylinder 32 for this purpose, the valves and the control of the same being left for subsequent description herein. It was stated that the cut-off slides 10 10 were opened and closed to discharge and cut off the meal forming the cake. These two slides when closed meet each other and when open separate, moving in opposite directions. This operation is performed by a straight to-and-fro motion of the piston of a hydraulic engine or cylinder 33, to which is connected frame 34, having inclined or cam slots 35 35, which engage the roller-pins 36 36, one on each of the cut-off slides 10 10. When the piston-rod is thrust outward, the cut-off slides separate by the action of the cam-slots, and when the piston-rod is drawn inward this closes them.

The chambers in the press which receive the soft cakes are necessarily, to avoid excessive extension of the press in opening the same, made of limited height, only just high enough to receive a cake of proper thickness and the thin pan upon which the cake rests. There is not room, therefore, in this space for any mechanism of considerable dimensions with which to discharge the cake from the pan. In the ordinary practice in linseed-mills where the soft cake is put upon a thin pan the workmen inserts the cake in place as follows: He thrusts the pan containing the cake about two-thirds of its length into the chamber and then puts his hand upon the end of the cake nearest him and draws the pan out about one-third of its length from beneath the cake, which leaves two-thirds of the cake still resting upon the pan. He then pushes on the pan until the cake has reached its proper position in the press, when he can again put his hand upon the end of the cake and now withdraw the pan entirely, leaving the cake in position in the press. Imitating this hand movement by mechanism as far as possible in the present machine the forward thrust of the cake-pan is adjusted so that it carries the cake about two-thirds of the way into the chamber of the press, and I arrange at the back of the press a device for seizing the cloth which wraps the cake at the fold between two nippers, which are thrust into the chamber at the proper time, and these nippers pull the cake or slide it on the pan and the bottom of the chamber clear home into position while the pan is being withdrawn, after which the nippers release their hold and are withdrawn from the chamber entirely. I will now describe this nipper mechanism, its construction, and mode of operation by reference to the drawings.

Referring to Figs. 27, 28, and 29, it will be seen that 37 37 represent two hydraulic cylinders, each containing a piston, and that 38 38 are piston-rods. The ends of these piston-rods are formed into the hooks 39 39, and these rods are long enough to have some considerable flexibility. Between the two cylinders 37 is an intermediate cylinder 40, the piston 41 of which is rigidly connected to a cross-head 42, through which the other two piston-rods pass and to which each is connected pivotally by the bars 43 43. This construction is such that if the two piston-rods of the outer cylinders are thrust forward and the piston of the middle cylinder also thrust forward at the same rate all three piston-rods will move parallel to each other; but if the two outer piston-rods are made to move faster than the middle piston-rod the pivoted bars 43, acting as links, will throw the flexible outer piston-rods 38 outward, and the converse of this proposition is true also—that is to say, if the outer piston-rods are moved backward more rapidly than the middle piston-rod the flexible outer piston-rods will swing inward—and it will be also noted that when the outer or hooked piston-rods are flexed outwardly their relative position longitudinally to the cross-head is changed—that is to say, the hooks are farther from the cross-head when they are swung out by the links than they are when they are swung in by the links. This peculiarity constitutes of the hooks and the cross-head a pair of nipping devices—that is to say, the hooks will open out from the cross-head both laterally and longitudinally and close down upon the cross-head both laterally and longitudinally. Matters are so adjusted, as will be presently described, that these nippers are thrust into the chamber of the press until the cross-head comes against the end of the cake, covered at this point by the bight of the cloth, and with the hooks open outwardly. At this juncture the outside piston-rods begin to recede, while the middle one and its cross-head stands still. This operation closes the hooks toward the cake, and the hooks come into contact with the cross-head, the cloth being interposed at each side between the hooks and the cross-head. The farther retrograde movement of the outer piston-rods and the retrograde movement of the middle piston-rod are coincident until the point is reached where the cake is fully in position. At this point the middle piston-rod is given a faster movement than the outer piston-rods, which causes the pivoted links to open the hooks, releasing them from the seed-cake, and the still further movement withdraws the hooks and cross-head from the press, completing the operation. The cylinders 37 37 and 40 are provided with an inlet-pipe 44, which supplies them with liquid at the front end, the middle cylinder having its supply made controllable by a cock or valve 45. This liquid-supply by the pipe 44 is from pump 46. (See Fig. 1.) This pump-cylinder 46 has its piston connected directly by a piston-rod with the cylinder 32, which operates the table 15, above described, so that as the table is withdrawn the liquid in the pump 46 is forced through pipe 44, and the pistons of cylinders 37 37 and 40 are acted upon thereby. This connection may be made in this way, because the power in the cylinders 37 37 and 40 is wanted at the time when the table is withdrawn, so that the pulling device may operate to withdraw the hooks and pull in the cake at the same time as the pan is being withdrawn from the press; but, as before explained, when the piston-rods of these three cylinders are to be withdrawn to pull the cake into the press it is necessary that the two outer piston-rods should move faster than the inner piston-rod for a short distance in order to clamp the cloth between the hooks and cross-head. I accomplish this by making the area of the piston in the two outer cylinders 37 37 greater than the area of the piston in the middle cylinder, which is done by making the piston-rod of the middle cylinder much larger in diameter than the piston-rods of the outer cylinders, which also enables me to have the piston-rod of the middle cylinder rigid, as required, and the piston-rods of the outer cylinders flexible, as required; but I have not considered it desirable to employ this same pump 46 for the purpose of moving these pistons of the pulling device in the opposite direction, as I prefer to accomplish this movement by liquid pressure, which is used in many other parts of the mechanism, and the special liquid pressure that I use for this purpose I designate as P', taken from an accumulator designated by the same letter P'. (See Fig. 4.) As this is the first occasion that I have had to mention the device known as an accumulator, which is a well-known contrivance in hydraulics, it may conduce to clearness to briefly describe at this point the nature of this well-known mechanism. An accumulator consists, essentially, of a strong vertically-placed cylinder containing a piston the rod of which projects up through the top of the cylinder. Upon the top of this piston-rod is placed a load or weight of any desired amount. The liquid is pumped into the cylinder beneath the piston and lifts this load, whatever it may be. Mechanism is usually added whereby when the piston has nearly reached the limit of its rise the action of the pump is suspended or the stream of liquid into the accumulator diverted, and when the piston has nearly reached its lower limit of motion the pump is again started into action or the stream let on. Liquid taken from such a cylinder by the pipe will stand in the pipe, and in whatever apparatus it may be led by the pipe, at a pressure determined by the amount of weight or load which has been placed on the piston. It may be remarked here in passing that in the present apparatus I provide three such accumulators, P', P$^2$, and P$^3$, of different powers, and these different pressures I prefer to have as follows: P', which is the lowest pressure, should be approximately one hundred pounds to the square inch. P$^2$, which is the next higher, should be approximately five hundred pounds to the square inch, and P$^3$, which is the highest, should be approximately two thousand five hundred pounds to the square inch. I could do the work with two accumulators, one, say, at five hundred pounds and one at two thousand five hundred pounds, but this would be attended with some inconvenience, owing to the necessity for reducing the sizes of some of the cylinders and having too many different sizes of cylinders. Indeed, all of the operations could be performed with a single accumulator—say of two thousand five hundred pounds pressure to the square inch; but this still further necessitates the reduction of the sizes of the cylinders and would not be so practical. It will be noted in this connection that I have, as will be subsequently seen, generally used the power P' for the lighter work of returning parts to their starting position. Now to resume the description of the operation of the cake-pulling device, which was interrupted: The cylinders 37 37 and 40 on the other side of the pistons are each supplied with liquid at the pressure P' by means of the pipes 47, which is connected to the accumulator P'. The power of the pump 46, which is operated by the movement of the table-operating cylinder, is sufficient, by virtue of the area of its piston, to force the pistons of cylinders 37 37 back against the pressure of P'; but the area of the piston in the middle cylinder 40, which is acted upon by this pump being less this piston is not moved by the pressure of the pump until the pistons of cylinders 37 have moved forward quite a distance to seize the cloth against the cross-head by means of the hooks above described; but now the outer pistons have reached their limit of motion independent of the middle piston, and thereafter the outer pistons begin to pull on the cross-head and aid the middle piston, so that all three will move together until the cake is moved into its proper position. At this time the piston of the middle cylinder 40, which is provided with a pivoted projection 48 for the purpose, strikes against a bell-crank lever 49, which opens the exhaust-valve 50, immediately releasing the pressure P' on the middle cylinder, the liquid escaping through this exhaust-valve to the waste-tank. (Not shown.) This exhaust relieving the counter pressure on the middle-cylinder piston that piston immediately is accelerated by the pressure on its other side from the pump 46 and springing back more quickly pulls back its cross-head at a more rapid rate of movement than the pistons of the outer cylinders, causing the hook piston-rods to spread, releasing the nippers from the cake, after which the pistons continue to move back together. As the bell-crank lever 49 is tilted the projection 51 on said bell-crank is raised far enough to come in contact with the pivoted projection 48, which lifts said pivoted projection 48 and throws it out of contact with the bell-crank, permitting the exhaust-valve 50 to close, and the further retrograde motion of the piston in the middle cylinder operates to restore the pressure P' in the middle cylinder, ready for the next advancing movement of the piston. It should be mentioned that as the opening of the exhaust-valve would cause immediate rush of liquid from the accumulator P', and thereby waste the liquid unnecessarily, I have provided a downwardly-opening puppet-valve 52, which normally is held down and open by its own weight on its valve-stem, but is light enough so that any rush of liquid from the accumulator P' will operate to force it up against its seat temporarily and check said rush of liquid; but when the exhaust-valve is closed and the further movement of the piston restores the pressure this puppet-valve falls open by gravity.

I have up to this point described the mechanism by following the material operated upon from its condition as seed through the crushing, the heating and moistening, and stirring operations, the forming of the meal into a cake, the wrapping of it in the cloth, and the delivery of the clothed soft cake to its chamber in the press. In so doing I have omitted to decribe particularly the means for raising and lowering the cake-supporting table, which, it will be remembered, is pressed downward in the formation of the cake to a certain point to determine the thickness of the cake, at which point its descent is positively arrested, the extruded cake is cut off, and then the table is caused to descend to a lowermost position, from which the cake is delivered, as above described, to the press. I will now describe at this place the means for arresting said table and for continuing its downward movement. The device for moving the table up and down consists of the hydraulic cylinder 53, on the top or head of the piston-rod of which the table is mounted. Underneath the piston of this cylinder a pipe admits liquid from the accumulator $P^2$, and above the piston of this cylinder a pipe admits liquid from the accumulator $P'$. In this latter pipe—the one communicating with accumulator $P'$—there is no valve or controlling device necessary, except, perhaps, an ordinary stop-cock for closing it when repairs are to be made, as shown in Figs. 3 and 4, near the accumulator. In other words, the communication between the accumulator $P'$ and the upper part of the cylinder 53 remains normally open and free. It is otherwise, however, with regard to pipe from the lower part of this cylinder 53, which communicates with the accumulator $P^2$. This pipe contains a double-acting valve 54, which is controlled by a cam 55, mounted on the shaft 56, which is driven by the prime motor of the mill. As this form of double valve is one used in several places in the mechanism, I shall describe it at this point in some detail. A peculiarity of this double valve is that it is operated by what I term a "floating lever," which is marked in the drawings 57, and in this particular instance the long arm of the floating lever is the one actuated by the cam. This lever becomes successively a lever of the first, second, and third order. Its prime fulcrum is the pivot 58 on the end of the sliding rod 59, so that the entire lever can have a bodily up-and-down movement and be held down yieldingly by the spring 60. At each side of the prime fulcrum 58 are pivoted to the lever the valve-stem 61 62. Now when the long arm of the lever is depressed the valve-stem 62 will descend and close its valve, as shown in the drawings at Fig. 21. In doing this, however, if we suppose that the valve-stem 61 was previously down and its valve closed the lever will fulcrum on valve-stem 61 in effecting the closure of 62, and valve-stem 62 being down if the long arm of the lever be further depressed the valve-stem 62 becomes the fulcrum and 61 is lifted and its valve opened, and this being the condition if the long arm of the lever be raised the effect will be to first close both valves and then by a further lift to open the valve 62 and keep 61 closed. To assist in this operation and render it more positive, the pipes and valves should be so constructed and arranged, as shown in the drawings, that the pressure of the liquid in its flow should be on the top of the valves or on that side which tends to close them. It will be understood from the foregoing that in operation either one of the valves may be opened at will by means of the lever, but that in so doing both valves are momentarily closed, and consequently only one of the valves is at any time open—that is to say, to open either one of the valves the other one will be necessarily closed in performing the act of opening, and this is accomplished without expensive parts or complicated mechanism and by use of a form of valve that can be readily ground to a tight fit. I am well aware that slide-valves have already been used for covering two ports, either one of which can be opened or both closed and which operate to close one port before the other is opened, and I could use such a valve in this place; but I prefer the form of valve described because it has no flat surfaces and can be easily maintained, and, moreover, is specially fitted to the pressures required in this connection. To facilitate the understanding of this valve, reference is made to Fig. 39, where one of these double valves is shown in another connection and upon a larger scale at the right-hand side of said figure.

Referring now again to Fig. 21, the double valve is shown with the valve 62 closed and the valve 61 open. In this position the valve is opened to receive liquid from the accumulator $P^2$ as the receiving-port is open and the exhaust-port closed, and this will be the condition when the piston in cylinder 53 is at the lower limit of its stroke and is about to start up, and the cam 55 is so constructed, as will be seen, that it will give a long dwell to the lever in this position, sufficient to cause the admitted liquid under pressure to drive the piston to its highest position and still remain open for a considerable time thereafter. The purpose of allowing the pressure to remain on the cylinder after it has reached its highest position and for a considerable time thereafter is that the table upon which the cake-pan rests and which receives the formed cake may resist the extruding effect of the plunger 11, which drives the meal down upon the table through the forming-opening heretofore described; but as the plunger 11 is driven by the piston of the cylinder 63 and as this cylinder is somewhat greater in size and its piston greater in area than the piston of cylinder 53 the descent of this plunger upon the meal forces the meal down upon the table and forces the table down with it, carrying down the piston in the cylinder 53 against the pressure of the same accumulator $P^2$, expelling the liquid beneath said piston through the open valve 61 back to the accumulator $P^2$ or into the system of pipes connected therewith; but, as before explained, to determine the thickness of the cake extruded I stop this downward movement at a certain point, as follows: On the piston-rod head of the cylinder 53 is a depending slotted bar 64, to which is fixed adjustably a projection 65. The adjustment is for the purpose of regulating the thickness of the cake. In the descent of the table the projection 65 strikes against the arm 66 of the bell-crank 67, to the other arm of which is pivoted the valve-stem 68, which closes the valve 69 in the pipe leading to the accumulator P², whereby the further escape of the liquid from cylinder 53 through valve 61 is stopped, and the descent of the table is thereby rigidly arrested, as liquids are practically incompressible; but plunger 11 continues to descend with its elastic head, as before explained, until the proper amount of pressure is brought upon the cake, as measured by the strength of the springs 14, solidifying the cake to the desired consistency. Meanwhile the cam 55 has continued to rotate and is now in position to raise the lever 57, which momentarily closes both valves 61 and 62 and then opens valve 62 to the exhaust. Pressure being thus removed from under the piston, the weight of the table and piston, aided by the pressure P' above the piston, is sufficient to carry the piston down to the lowest limit of its movement. In the meantime the projection 65 has passed the arm 66, which leaves valve 69 free to open. To permit the table to rise without affecting the lever 67, the arm 66 on said lever is pivoted and free to rise, but held from descending by a stop and maintained in position by a spring 70 at all other times.

In the beginning it is noted that the plan of the invention is to bring a series of presses one after another bodily into position close to the cake-forming apparatus, and as the cake-delivering apparatus is constructed to deliver a cake at a certain point also to raise and lower the press to be filled, so as to bring the several chambers of the press one after another to the proper height. I shall now describe the construction of the mechanism in this respect, as follows: In the drawings I have shown a construction wherein twenty-four presses are included in the series, which presses are designated by the numeral 71; but a different number of presses may be used, if desired. With twenty-four presses and working the machinery at a very moderate speed, so as to allow two and one-half minutes for filling or emptying the presses, it is possible to give nearly an hour for each press to stand under the pressure and yet make twenty-four pressings per hour by this apparatus. The presses are mounted on an annular framework 72, which must of course be very strong to support the weight. The under surface of this framework 72 is preferably grooved with two grooves 73 73 to accommodate the antifriction-balls 74, which rest in turn in grooves in the foundation-plate 75. This constitutes a solid antifriction turn-table. The presses 71 rest down upon this annular turn-table 72, and below each press is a conical aperture 76, extending clear through the turn-table. Each press is provided with a conical projection 77 on its bottom, which when the press is resting on the turn-table enters this conical aperture, which conical aperture serves to position the press accurately and as another function permits the piston-rods 78 79 from the hydraulic cylinders 80 81 to rise through the turn-table, which cylinders are intended to raise and lower the presses in succession—first, for the purpose of emptying the filled press, and, secondly, for the purpose of filling the empty press. At some height above the base of the turn-table 72 is an annular stringer 82, and from this stringer to the turn-table 72 descend at regular intervals guide-rods 83, one between each pair of adjacent presses. Projections 84 84 84 extend from each side of each press to engage these guide-rods to steady and guide the presses when they are raised and lowered. It may be noted that as there is a press on both sides of each guide-rod these rods are braced against lateral deflection by the presses themselves, and hence need not be so heavy or strong as would be otherwise required. As a convenient method for tramming or adjusting the bottom of the press to the conical plug 77, the under surface of which ought to be true and at right angles to the vertical lines of the press, I construct this part as shown in Fig. 6, where it will be seen that the conical projection 77 is made hollow, filled with cement 85, and furnished with adjusting-screws 86 and with clamping-screws 87. After the press has been placed down upon the adjusting-screws 86 and by their aid properly leveled the clamping-screws 87 are set home firmly, and then to make all secure the cement 85 is filled in. It will be more convenient at this point to describe the mechanism by means of which the turn-table is rotated by a step-by-step movement, deferring the explanation of the operation of the cylinders 80 and 81. Attached to the turn-table 72 and extending radially outward are projections 88, one for each of the presses and accurately spaced around the circle, thus forming, so to speak, "ratchet-teeth." These ratchet-teeth are engaged by a flexible pawl-head 89, mounted on the piston-rod 90 of the hydraulic cylinder 91. The pawl-head 89 is pivoted to the piston-rod and held up to its work by a spring 92, which permits it to drag back past the succeeding projection or ratchet-tooth after the manner of pawls. The cylinder 91 is constructed so that the stroke of its piston shall equal in extent the spacing between the projections 88 or ratchet-teeth, so that each forward stroke of the piston, the pawl engaging the tooth in front of it, will propel the turn-table one press-space. As this series of presses and the appliances moved therewith are of a ponderous character and very heavy, perhaps weighing in the neighborhood of four hundred tons, even though the movement is slow the momentum might be sufficient, so that the turn-table would not stop at the exact limit of the action of the piston, and hence I have provided an arresting mechanism, as follows: On the piston-rod 90 (see Fig. 17) I fix a cam projection 93, which engages a lever 94, which is a floating lever, such as has been heretofore described, and which operates one of the double valves 95 of the character already described. When the piston-rod reaches a certain point in its forward movement, the projection 93 engages the floating lever 94 and operates the valve 95 to admit liquid from the accumulator P² to the lower part of the cylinder 96, which lifts the piston of said cylinder and a detent-block 97, mounted on the upper end of the piston-rod, and causes said detent-block to engage a cavity in the under surface of the turn-table 72. The detent-block 97 has its upper surface made with two bevels or angles, a steep incline 98, and a gentle incline 99, the steep incline being in front, and the cavity which this detent enters is correspondingly formed. The projection 93 on the piston-head should be so adjusted that the detent will rise slightly in advance of the point at which the turn-table is to stop, so that the front or steep incline of the detent will be the first to engage the cavity and will engage said cavity of course on the steep incline of said cavity. A further rise of this detent-block tends by its wedging action to further rotate the turn-table in the forward direction, which may thus be moved beyond the limit of action of the pawl-head. As this wedging action may be made to operate very slowly, there will be no danger of the overrunning of the turn-table; but to further guard against such possible overrunning the more slightly inclined surface 99 is provided, which will engage the similar incline in the cavity on the turn-table and set up a frictional stop-action, which will positively stop the turn-table at the desired point. Although I have only shown one detent and its operating-cylinder, more than one can be used as desired, all being operated from the same valve, and it may be incidentally remarked that this is also true in respect to the cylinder 91 and the pawl it operates.

The cylinder 91, which drives the pawl for turning the turn-table, as above described, is thrown into action by means of the cam 100, mounted on a counter-shaft 101, which is geared to the shaft 56 above mentioned by gearing which drives shaft 101 at a slower rate, the rate of movement being one revolution of the shaft 101 to ten revolutions of the shaft 56, that happening to be the number of chambers in each press. If a different number of chambers be made in each press, this ratio should be correspondingly changed. Shaft 56, it will be remembered, is driven by the prime mover of the mill. Each revolution of the cam 100 actuates the floating lever 102 of one of the double valves heretofore described and in this instance designated as 103. This valve at stated intervals admits liquid from the accumulator P² behind the piston of said cylinder 19 and causes it to be moved forward to the limit of its stroke, and thus actuate the turn-table. On the other side of the piston liquid from the accumulator P' stands, and when the cam 100 revolves to such position as to shift the double valve 103, and thus to open the waste-pipe thereof, this pressure P' returns the piston to its starting position ready for another operation. We have now reached a point where it will be convenient to resume the description of the operation of the cylinders 80 and 81, above temporarily suspended. Immediately following the stoppage of the turn-table the press which stands over cylinder 80, which is now filled with the pressed cake, and the neighboring press, which stands over the cylinder 81, are to be raised together, the first-mentioned one, containing the finished cake, being raised in the position for the purpose of discharging the cake by the discharging mechanism presently to be described and the empty press next in advance of it to be raised for the purpose of filling the same by the mechanism already described. Both presses are to be raised to a height such that the lowermost chamber in each comes on a level with the discharging and filling apparatus. From this elevated position the presses are to be consequently lowered with a step-by-step movement, a step for each of the chambers therein. For the purpose of starting this action of raising the presses I provide a device which is shown in Fig. 8, but more clearly shown in Fig. 39. This device consists of a liquid-compressing chamber formed in the head of the cylinder 91, which is entered by a supplementary piston or plunger applied to the piston of the cylinder, the effect being to produce in the compression-chamber a greater amount of pressure than the power P', which stands in the same end of that cylinder, and this additional power thus created and which I may term $P^x$—a power in excess of P' and which may therefore be employed to overcome P'—is delivered to a small cylinder on one side of a piston which has P' on the other side, and the result is that the piston of this small cylinder may be actuated by the power $P^x$ to do any small work required and being thrust against the pressure of P' will when the power $P^x$ is wasted or exhausted be returned by the power P' to its starting position. This appliance serves also the additional function of a dash-pot or a yielding resistance to the upward thrust of the piston in the cylinder in which the compression-chamber is located. As the act of compression and the exertion of this power $P^x$ take place at the end of the stroke of the piston of the cylinder 91, I can use it as the means of starting into operation the cylinder 80 and the cylinder 81, which rise together. Referring now to the drawings and especially to Fig. 8, it will be seen that in the head of the cylinder 91 is a chamber 104, which surrounds the piston-rod and is of less diameter than the diameter of the cylinder, and upon the piston-rod 90 of this cylinder is an annular enlargement 105, equal in diameter to the diameter of the chamber 104. At the end of the stroke of the piston this annular enlargement 105, acting as a plunger, enters the chamber 104 and compresses its liquid contents, which, it will be remembered, consists of the liquid standing in this end of the cylinder of the power P' from the accumulator of this designation. As the plunger advances in the chamber the contained liquid in the chamber is compressed to a still higher power and forced out through a pipe to the small cylinder 106, entering beneath the piston of this cylinder with the power, which I term "P$^\times$," and raising said piston. To this piston is connected the lever of valve 107, which is thus controlled to admit liquid at the power P$^2$ beneath the pistons of the cylinders 80 and 81 and cause said pistons to rise, lifting the superimposed presses up to the required height. As I provide cylinder 81 with a similar compressing-chamber to start into action the next succeeding movement of the mechanism, it is important that this latter cylinder should not finish its action previous to the time when cylinder 80 finishes its action—in other words, that the next succeeding performance should not begin until both presses are fully elevated—and to insure this result I provide in the pipe which carries the liquid of the power P$^2$ to the cylinder 81 the regulating-cock 108, which may be turned to partly obstruct the flow sufficiently to insure that the piston of cylinder 81 shall not reach the limit of its stroke until after the piston of cylinder 80 has reached the limit of its stroke. When the presses are up to their highest position, they are held there simply by the pressure in the cylinders 80 and 81 of the liquid under power of P$^2$ beneath their pistons. Now when the cylinders are to be lowered they must descend, as will be remembered, in a step-by-step manner to bring the discharging and filling apparatus in proper position with the several chambers successively. This operation is accomplished as follows: On the shaft 56 are two cams 109 and 110, so timed that when the pistons of the cylinders 80 and 81 have come to the highest point and ready to return the cams 109 and 110 will operate the floating levers 111 and 112 of the double valves 113 and 114 to open communication from the lower part of cylinders 80 and 81 to the small cylinders 115 and 116, so that the liquid contents from beneath the pistons in cylinders 80 and 81 will pass into cylinders 115 and 116 in a quantity measured by the size of said small cylinders 115 and 116, permitting thus the descent of the pistons of cylinders 80 and 81 in a measured manner to the extent of the liquid thus admitted to the small cylinders 115 and 116. In entering said cylinders 115 and 116 the liquid forces the pistons of these cylinders out until their piston-rods strike against a regulable stop 117 and 118, one for each cylinder. Adjustment of these stops will determine the extent of movement of the pistons, and this by determining the amount of liquid which passes from the cylinders 80 and 81 will measure and control the distance that the presses will descend in each step. The descent of the pistons in cylinders 80 and 81 is caused by the weight of the presses, aided by the power P', which stands at all times above the pistons of these cylinders. So, too, with regard to the small cylinders 115 116, the power P' stands at all times back of the pistons of each of these cylinders for the purpose of returning them to their starting position, which takes place when the cam 110 in its further revolution reverses the double valves 114 114 and permits the liquid contents which have been admitted thereto from cylinders 80 and 81 to escape or waste. While the turn-table is being moved forward to put the presses in position and while the presses are being raised into position occurs a period of time during which many of the other operations of the mechanism, and especially those operations controlled by cams, should be entirely suspended, and I prefer to do this by stopping the rotation of the cam-shafts, and this I effect by means of what can be called a "counting mechanism," which I will now describe.

Referring to the drawings, (see Figs. 3, 4, and 10,) 119 is an ordinary cone-pulley, which receives the power from the line-shafting of the mill. This pulley is connected by a clutch 120 to shaft 121. The clutch 120 is operated by the clutch-lever 122, (see Fig. 11,) and its purpose is to start the mill into operation at the beginning of the day and to shut off the power at the close of the day. The fulcrum 123 of this lever consists of a stop-cock 123, which constitutes a valve in the main pipe leading from the accumulator P$^2$ to the entire system of hydraulic engines, so that when the power is turned onto the revolving shafting the power from the accumulator P$^2$ will simultaneously be turned onto the hydraulic engines and in like manner shut off when the lever is moved in the other direction. On the shaft 121 is a gear-wheel 124, containing ninety teeth, and also a gear-wheel 125, containing one hundred teeth. On the shaft 56 is a gear-wheel 126, having one hundred teeth, which meshes with the gear-wheel 125. Parallel with the shaft 121, but not quite axially in line with shaft 56, is shaft 127, carrying the gear-wheel 128, containing one hundred teeth, which meshes with gear-wheel 124, containing ninety teeth. From this gearing it is evident that shaft 56 will revolve at the same speed as shaft 120, but that shaft 127 will only have nine-tenths of the speed of shaft 120. In other words, while shaft 120 and shaft 56 are revolving ten times shaft 127 will revolve only nine times. On shaft 56 is a disk 129 on the end of the shaft, and on shaft 127 is a disk 130, the two disks standing close together side by side. In the periphery of each disk is cut a notch 131, and it will be seen that in every ten revolutions of shaft 56 these two notches will coincide in position, as shown at Fig. 10. Immediately above these disks (see Fig. 9) is a lever 132, carrying a projection 133, which projection rests down upon the periphery of the two disks, so that when the notches of the two disks coincide and at no other time the projections 133 on said lever will enter the two notches and lock the two disks together, arresting the further movement of the gears 124 and 125 and the shafts 127 and 56, though the shaft 121 continues to rotate, owing to the fact that the gears 124 and 125 are connected thereto by a friction-clutch. The friction-clutch which secures the gears 124 and 125 to the shaft 121 consists of friction-hub 134, keyed to the shaft 121, and a pair of friction-brakes 135 135, secured to a suitable casing and held in contact with the hub 134 by the springs 136 136. These springs are secured to the casing, and the casing is mounted upon a sleeve which carries the gears 124 and 125, so that the connection between said gears and the shaft 121 consists of the frictional contact of the brakes with the hub keyed to said shaft. A releasing-lever 137 is pivoted to said case and comes in contact on both sides of its fulcrum with projections 138 138, attached to the brakes. This lever 137 projects through the casing and extends far enough out so that when the lever 132 is swung toward the gear 126 and the projection 133 has entered the notches 131 this brake-operating lever 137 in the further rotation of brake-casing and gears connected thereto will strike against the end of the lever 132, which contact will cause said lever 137 to tend to release the brake or lessen its action. As it is the power of shaft 121 itself acting through the brake which causes the lever 137 to press against the end of lever 132, it will be seen that the brake will not be entirely released, but only have its force lessened, so that the brake will be in condition to continue the motion of the gears 124 and 125 as soon as the obstruction caused by lever 132 is removed from the path of the lever 137. This form of frictional driving and releasing mechanism, so far as the brake is concerned, is an old and well-known device sometimes used on iron-planing machines and is described here only in order that the action of the other parts may be understood. While at this place and to avoid repetition, I desire to point out the ratchet-wheel 139, which is attached to the gear 125. 140 is a pawl for actuating this ratchet through the medium of the lever 141. This lever 141 should extend to or be connected to other devices extending to a position where it may be readily operated by the person who controls the mechanism as a whole. The purpose of this ratchet contrivance is to afford means for setting back, whenever required, the position of the shaft 56, which carries the actuating-cams. If the attendant should fail to put in a cloth, for example, and the mechanism shall proceed beyond this point, which would lead to the loss of a formed cake, he can resort to this ratchet device to correct the error by first stopping the whole mechanism by means of the lever 122, and then by means of the ratchet-lever 141 he will be able to turn shaft 56 back through an entire revolution or more, if desired, and set it at a starting-point. To throw the pawl 140 into and out of contact with the ratchet when not required in order that there should be no interference, I provide a guard 142 under the pawl, so that the latter will be lifted out of contact with the ratchet when the lever is put in a certain position, as will be understood, and it will be seen also that its action is automatic, for the guard 142 is stationary, being supported on the framing of the machine, and if the attendant shall carelessly leave the lever 141 in the wrong position when the ratchet begins to rotate the teeth will force the pawl back and carry the lever with it until the pawl comes in contact with the guard, when further movement will cause the pawl to be disengaged or lifted.

It will be remembered that the foregoing description left the detent-lever, with its projection 133, buried in the notches. Now this will not always be the case when it is desired to reverse the shaft 56 by means of the ratchet above described; but it may be the case. To guard against this, I provide a projection 143 (see Fig. 11) on the stopping-lever 122, so that when the stopping-lever is operated this projection will come in contact with the detent-lever 132 and lift the detent out of engagement.

The detent-lever 132, it will be remembered, locks the cam-shaft 56 at the tenth revolution of said shaft—that is to say, after the ten chambers of the press which is being emptied have been all discharged and after the ten chambers of the press which is being filled have all been filled and that it is desired that this locking shall continue until the filled press has been moved out of the way and the empty press moved into position to be filled and another press containing finished cake has been moved into position, and, further, until the empty press and the press to be discharged are raised into the elevated position by the action of the cylinders 80 and 81. Now at this point the detent-lever must unlock the detent to permit the prime motor to resume the driving of cam-shaft 56, the cams upon which control the cake forming, filling, and discharging cylinders. This action is brought about as follows: In the cylinder 81 I provide such a compression-chamber as has already been described with reference to cylinder 91, which furnishes the power $P^x$ to a small cylinder 144. The result is that just as the piston of cylinder 81 is finishing its upward stroke the small cylinder 144 is brought into action and the detent-lever 132 lifted out of the notches, and the prime motor immediately starts the shaft 56, after which said small cylinder 144 permits the detent-lever to drop again upon the periphery of the notched disk in position to engage the notches, when after ten more revolutions they shall again coincide. Of course now the two presses which have been elevated are free to descend in a step-by-step manner heretofore described.

To avoid confusion, I omitted heretofore to describe the cake-discharging mechanism, although I have described the means for lowering the press to be discharged in a step-by-step manner. This discharging mechanism consists of a chisel-shaped plunger 145, made in blade form, with a shoulder, the sharp edge of which enters beneath the cake and the shoulder of which engages the end of the cake. This plunger is operated by the cylinder 146 (see Fig. 2) and enters that chamber of the press which is in position before it and thrusts the cake out upon the stripper-table 147, which is constructed as stripper-tables are commonly made and the function of which is to enable the attendant to strip the cloth from the cake after which the stripped cake is pushed down the runway 148 out of the machine. This cylinder 146 is operated by the pump 46 by liquid taken from the other side of the piston of said pump. It will be remembered that this pump 46 is the one which supplies liquid to the three cylinders which actuate the mechanism for pulling the formed cake into the press that is being filled, and by "opposite side" in the last sentence I mean the other end of the pump from that which supplies the three cylinders.

After the press is lowered and filled, as above described, and rests again upon the turn-table the next impulse of the pawl-cylinder carries the filled press into position such that the hydraulic pressure may be applied to the press itself, and this is the next thing done. Each press is provided with the ordinary hydraulic cylinder 149, the piston of which in moving upward lifts the platen 150 and compresses the cakes in the several chambers. The hydraulic pressure which I employ for this actual work of pressing I prefer should be, as before stated, about two thousand five hundred pounds to the square inch and which I have termed hereinbefore power $P^3$ and which is taken from the accumulator of that designation. To distribute this liquid to all the presses, it is first led from the accumulator to the axis of the turn-table, where it is delivered through a stuffing-box 151 to one or more radial pipes 152 to a ring-pipe 153, from whence it is led by pipes 154 to the vertical stuffing-boxes 155, in which are inserted the telescoping pipes 156. This telescoping arrangement is to accommodate the rise and fall of the presses, the pipe 156 in each case entering the valve-chamber of the press to be supplied. Of course it will be understood that instead of a telescoping pipe an extensible pipe after the fashion of a folding gas-light pipe may be used. This valve-chamber is shown at 157. For convenience of operation and construction the valve-chamber 158, which constitutes the discharge-valve, is located side by side with said inlet-valve chamber 157. These chambers are made circular in form and the valves are made cylindrical to fit therein. The ports, both in the chambers and in the cylindrical valve-blocks, are made pear-shaped or tear-shaped, as shown in Figs. 34 to 38, inclusive, although this construction is important only in respect to the inlet-valve and not necessary in respect to the waste or outlet valve. The pear-shaped apertures in the block and the chamber are cut with their points toward each other, and the purpose of this construction is so that the pressure may be regulated and the flow gradually increased or diminished, as desired. In Fig. 36 the apertures are shown in diagram in the closed position of the valve. In Fig. 37 the valve is shown as partly open, and in Fig. 38 as wholly open. When a press is filled with soft cakes, there is of course more or less room in the press unoccupied by the cakes and which is necessarily left in order to get the cakes readily into place, and this excess room is called the "slack" of the press, which slack must be taken up before the pressure begins. The amount of slack in a press is often as much as one-third of the total lift of the platen before any oil begins to flow, and it is desirable that this slack should be taken up as quickly as possible, and it is for this reason that I provide the form of valve-port above described, which may be opened very widely when the pressure liquid is first put on and thereafter closed very narrowly. If after the pressing begins and the oil begins to flow the liquid were admitted very rapidly to the cylinder, there would be a tendency to force the meal out with the oil, and it is to avoid this and produce a slow gradual rise of the platen throughout the flow of the oil that the liquid should be admitted very slowly to the cylinder. This rate of admission of the liquid to the press-cylinder may be regulated so that the complete rise of the platen will be finished at any point short of the arrival of the press at the discharging position and should be regulated so that the pressing will be finished just before such arrival. By this arrangement—that is to say, by providing the valve, which can be narrowly regulated—I produce on the cakes in the press throughout the entire period of pressing a gradually and constantly increasing pressure, and this is productive not only of a more uniform result, but also of an increase in the amount of oil extracted. Heretofore in the operation of oil-presses it has been customary to change the amount of liquid admitted to the cylinder from time to time, with the result of an irregular increase in pressure. This causes a loss of time in the efficiency of the press, as will be readily understood, for it will be seen that no matter what the amount of pressure it requires a certain period of time for the oil to flow out of the cakes, and consequently a sudden increase of pressure tends to close the cake and retard the flow of the oil. The best way I know of to produce a regular and constantly-increasing pressure is by admitting the liquid to the cylinder slowly and about the rate at which the press will yield readily by reason of the outflow of the oil from the cake. To operate the valves automatically, I provide each with a lever 159 for the inlet-valve and 160 for the outlet-valve, which swivel on the valve-stems, and each is furnished with a shoe 161, resting upon stationary circular tracks outside of and concentric with the turn-table, the track for the inlet-valve (designated as 162) being on the outside and the track 163 for the outlet-valve being on the inside. By providing these tracks with a cam-surface any motion in any time desired may be imparted to the valve-operating levers, as the shoes will slide over the track as the press moves and conform in position to whatever elevation or depression may be placed in their path. As a matter of adjustability I do not connect the levers directly to the valves themselves, but provide shorter additional levers 164 and 165, which are attached to the valves and are provided at their free ends with adjusting-screws 166, setting down upon the swiveled levers above mentioned and held down in place each by a spring 167. This construction enables me to adjust the position of the valves with respect to the operating-lever. The cam-surface of the track is arranged as follows: With respect to the inlet-valve the cam-track is so constructed that as soon as the press begins to move the inlet-valve is thrown wide open, but held open only long enough to take the slack out of the press—as, for example, by an abrupt projection 168. This projection is made long enough only to permit the slack to be taken out and the oil-yielding point in the compression of the cakes reached, at which point the inlet is closed down to a narrow aperture by permitting the shoe to descend until the valve is nearly closed, but not quite closed, and this condition continues until the discharging position of the press is nearly reached, when the construction of the track is such that the shoe again descends, entirely closing the inlet-valve, and at this point the outlet-valve, which up to this time has remained closed, is now opened by a declivity in the track, and the liquid in the cylinder flows out, aided by the gravity of the platen, and is conducted by a suitable pipe into an annular pan placed beneath and extending around the turn-table, which pan is not shown in the drawings.

I have already described one of the cams on the shaft 56, the cam 55, and its double valve with a floating lever, &c., as controlling the table-elevating cylinder. It will be sufficient to say with regard to the similar cams on this shaft that the cam designated 169 operates in a similar manner to control the plunger-cylinder 63 for extruding and compressing the meal into the form of a cake, that the cam 170 in like manner operates and is suitably timed to operate the cylinder 33 for opening and closing the cut-off gates in the bottom of the meal-tub, and that cam 171 is constructed and timed to operate in like manner the cylinder 32 for pushing forward the table carrying the cake-pan and cake. Finally, it only remains to say what was omitted to avoid confusion in the description that the cams 109 and 110 on shaft 56 and which operate the cylinders 115 and 116, which control the step-by-step descent of the presses, as heretofore described, should be so mounted on said shaft 56 that when this shaft is reversed or turned backward to set it, as heretofore explained, such turning back will not move these cams out of position until a complete revolution has been reached. This is accomplished by mounting said cams 109 and 110 loosely on said shaft 56 through the medium of a sleeve or hub connecting them together and connecting the cams to the shaft itself by a projection from the shaft which carries a pawl engaging a tooth on the periphery of the cam, so that when the shaft turns in one direction the cam will be carried around with it, but when the shaft is reversed a friction-spring or other similar device will hold the cam in position, and the pawl will drag over the tooth without causing any motion in the cams. This construction will be more clearly understood by reference to Fig. 13. A like provision for the same reason is required in connection with cam 100 on the counter-shaft 101 and which cam operates the valves controlling the cylinder 91, which drives the pawl for rotating the turn-table carrying the presses. It will be seen that the gear which drives this counter-shaft is mounted loosely on the shaft and is connected to the cam which is mounted fixedly on said shaft by means of a single-fingered clutch which permits a reverse movement of the gear without changing the position of the cam.

It should be noted that the stirrer-arm in the meal-tub 5 cannot be permitted to rotate continuously without interference with the plunger-head, which at stated intervals descends into said tub to extrude the meal to form the cake. Referring to Fig. 7, it will be seen that the rotation of the stirrer-arm is effected as follows: 172 is a driving-pulley on the shaft 173, which takes its power from the prime mover of the mill. On this same shaft at the other end is a friction-gear 174, that engages with a friction-gear 175 on the shaft 176, on the other end of which shaft is a bevel-gear 177, meshing with a horizontal bevel-gear 178 on the shaft 179, which extends up into the meal-tub and carries said stirrer-arm. On the horizontal bevel-gear 178 is a projection 180, which in the revolution of said gear-wheel strikes against the inclined projection 181 on the short end of the lever 182. This lever 182 is in itself a pawl which engages the ratchet-wheel 183 and holds said ratchet-wheel from rotation. On the ratchet is a crank-pin 184, connected by a pitman 185 to the piston-rod 186 of a cylinder 187. On the axle of the ratchet-wheel is cut a screw-thread which engages a half-nut on the arm 188, which is connected to the sliding frame 189, which carries the shaft 173 and one of the friction-gears 174, the construction and arrangement being such that when the piston of the cylinder 187 is thrust outward the pitman will revolve the ratchet-wheel through a small arc, which in turn by revolving the screw on the axle of said ratchet moves the sliding frame to separate the two friction-gears, and thus bring the stirrer-arm to rest, and this condition will continue until the piston is moved in the opposite direction in the cylinder. As the timing of the plunger-cylinder and of this ratchet-operating cylinder are coincident, said ratchet-operating cylinder may be controlled by the same cam that controls the valve of the plunger-cylinder, and this may be effected by means of branch pipes leading from the pipes of said plunger-operating cylinder, as will be readily understood. Of course it will be understood that the projection 180 on the horizontal gear at the lower end of the stirrer-arm shaft should be located with reference to the position of the stirrer-arms so that they will be stopped in such manner that they will not interfere with the descent of the plunger into the meal-tub.

When the mill is to be shut down—for example, at night—it is desirable that the liquid under pressure should be entirely cut off from each of the press-cylinders as fast as the presses are empty of the final charge. I accomplish this conveniently and easily by applying to the lever 159, which is swiveled to the inlet-valve stem, a pivoted saddle 190, which normally stands in the condition shown in Fig. 33. The saddle forms the seat of the adjusting-screw 166, which determines the relative position of the levers 159 and 164, said supplementary lever 164, as will be remembered, being fast to the valve-stem. At the side of the cam-track is a vertical sliding bar 191, (shown in dotted lines in Figs. 31 and 33,) which extends to a point in convenient reach of the operator of the machine. On this bar are placed two pins 192 193. (See Figs. 31, 32, and 33.) When the bar is pulled up into the position shown in Fig. 132, the saddle 190 will pass between the pins without striking either one. Now if the sliding bar be pushed down from the positions shown in Figs. 32 and 33 the saddle will strike against the upper pin 192 and will be turned up into the position shown in Fig. 31, raising the supplemental lever 164 to a new seat and closing the inlet-valve entirely and far enough so that said valve will not be opened by the action of the depending lever 159 on the cam-track. In the morning or at such time as the mill is again to be put in operation the sliding bar 191 is moved far enough in the opposite direction so that the saddle will encounter the pin 193 and its position will be reversed, permitting the inlet-valve to be opened by the cam-track to control the varying opening of the inlet-valve, and thereafter in this position the saddle will pass between the pins without contact.

I do not claim in this application, broadly, the hydraulic and valve mechanism herein shown and described, the same being the subject of my application, Serial No. 94,090, filed February 14, 1902.

I claim—

1. In an oil-mill, the combination of a heater for heating the meal, a cake-former, a conveyer from the heater to the cake-former, a hydraulic press and a conveyer for conveying the cake to and delivering the same into the hydraulic press, substantially as specified.

2. In an oil-mill, the combination of a cake-former, a pan upon which the formed cake rests, a table upon which the pan rests, and means for moving the table and the pan, the latter at a greater speed than the former, and a hydraulic press to which the pan delivers the formed cake, substantially as specified.

3. In an oil-mill, the combination of a cake-former, a pan upon which the formed cake rests, and means for moving the table and pan, the latter at a greater speed than the former, said means consisting of a hydraulic cylinder and piston for moving the table, a stationary rack-bar on the table-support, a gear on the table and a rack-bar on the pan, where the motion of the table is multiplied to the pan, and a hydraulic press, substantially as specified.

4. The combination with a meal-tub for containing the heated meal and having a conduit or opening the size of a press-cake, of a plunger for compacting the meal and extruding it from the opening, the head of said plunger being made in multiple sections, each section being independently yielding, substantially as specified.

5. The combination with the meal-tub for containing the heated meal, and having a conduit or opening the size of a press-cake, of a plunger for compacting the meal and extruding it through said opening, a yielding table to receive the extruded meal, a means for stopping the table at a cake thickness from the opening, substantially as specified.

6. The combination with the meal-tub for containing the heated meal, and having a conduit or opening the size of a press-cake, of a plunger for compacting the meal and extruding it through said opening, a yielding table to receive the extruded meal, means for stopping the table at a cake thickness from the opening, and means for cutting off the extruded meal to form the cake, substantially as specified.

7. The combination with a cake-forming machine, of means for folding the press-cloth over the cake which consists of a bar at each end of the cake over which bar the ends of the cloth lie, and mechanism for moving the cake and cloth under one bar and for moving the other bar over the cake, substantially as specified.

8. The combination with a cake-pan constructed to be moved endwise into the press and to receive a press-cloth and a formed cake lying on the press-cloth, of a bar placed in front of and above the cake, and over which the front end of the cloth may lie and under which the cake may be moved, as a means for folding down upon the cake the front end of the cloth, substantially as specified.

9. The combination of the cake-pan the table upon which said pan rests, means for moving the table and the pan, the latter at a greater speed than the former, and the mechanism for folding the press-cloth over the rear end of the cake, and which consists of a bar mounted upon a pivoted arm carried on a slide sliding on the table, a latch for latching the slide, and a spring for actuating the arm and slide with a rapid movement when the latch is released by the rotation of the arm, substantially as specified.

10. The combination of a cake-former and a cake-conveyer which delivers the formed cake part way into the chamber of the press, resting upon a pan, and means at the other side of the press for seizing the cake and pulling it the remainder of the distance into the press while the cake still rests partly upon the pan, which latter may then be withdrawn leaving the cake fully inserted in the press-chamber, substantially as described.

11. The means for pulling the formed cake home into the press-chamber from the back side of the press, which consists of a pair of nipping devices adapted to seize the fold of the cloth around the cake at the front end thereof, and means for pushing said nippers into the press, opening them, closing them, withdrawing them from said chamber and opening them to release their hold upon the cloth, substantially as specified.

12. The mechanism for pulling the cake into the press, which consists of the combination of two outer hydraulic cylinders, the piston-rods of which are hook-formed at the ends and are flexible, and an inner hydraulic cylinder, the piston-rod of which carries a cross-head which is connected by pivoted bars to the flexible piston-rods of the outer cylinders near the hooks, the cylinders being so constructed and supplied with power that in the outward movement of the pistons the piston of the inner cylinder will be retarded, causing the hooks to spread apart by action of the pivoted bars, and in the return movement the movement of the piston of said inner cylinder will again be retarded, causing the hooks to close upon the cloth of the cake, and so that said piston of the inner cylinder at a certain point in its return stroke will be accelerated for releasing the hooks from the cloth, substantially as specified.

13. The combination of a cake-former and a conveyer with a hydraulic press, and means for moving said press vertically with a step-by-step motion to present in sequence the several press-chambers of the press opposite to the cake-conveyer mechanism, substantially as specified.

14. The combination of a cake-former and a conveyer, with a series of hydraulic presses and means for moving said presses horizontally to and from the cake-conveyer, substantially as specified.

15. The combination of the cake-former and a conveyer with a series of hydraulic presses and means for moving said presses horizontally to and from said former and conveyer, and means for moving said presses vertically with a step-by-step motion to present the several press-chambers of each press opposite to the cake-conveyer mechanism, in sequence, substantially as specified.

16. The means for moving a hydraulic press vertically in a step-by-step movement, which consists of a hydraulic cylinder for lifting the press to the highest position, and a second hydraulic cylinder connected with the first for lowering said press by discharging in measured quantities at intervals the contents of said lifting-cylinder, substantially as specified.

17. The combination with a cake-former and a conveyer of a series of hydraulic presses mounted on a turn-table and mechanism for rotating the turn-table into position contiguous to the cake former and conveyer by a step-by-step movement, substantially as specified.

18. The combination with a cake-former and a conveyer of a series of hydraulic presses mounted on a turn-table and mechanism for rotating the turn-table into position contiguous to the cake former and conveyer by a step-by-step movement, said step-by-step rotation being accomplished by means of a pawl actuated by a hydraulic cylinder, and thrusting against teeth on the turn-table, substantially as specified.

19. The combination with a series of hydraulic presses mounted on a turn-table, means for rotating said turn-table with a step-by-step movement, and means for lifting and lowering two of the presses, substantially as specified.

20. The combination with a series of hydraulic presses mounted on a turn-table, means for rotating said turn-table with a step-by-step movement, and means for lifting and lowering two of the presses, the means for lowering the presses being constructed to lower them with a step-by-step motion, substantially as specified.

21. The combination with the turn-table carrying the series of presses, of the hydraulic cylinder, its pawl and the teeth on the turn-table for turning the turn-table with a step-by-step motion, and a hydraulic cylinder for raising and lowering a press, the latter cylinder being set into action by the former cylinder, and its operation succeeding that of the former cylinder, substantially as specified.

22. The combination of the turn-table moved by a hydraulic cylinder with a step-by-step motion, and two hydraulic cylinders for raising and lowering two presses and set into action by the cylinder which moves the turn-table, substantially as specified, and whereby one press is put into position for discharging the finished cake and another put into position to be filled with soft cake, the latter press being the one just previously discharged.

23. The combination with the turn-table carrying a series of presses, and provided with ratchet-teeth or projections, the hydraulic cylinder, the piston-rod of which forms a pawl for actuating the turn-table with a step-by-step movement, and a detent for stopping and positioning the turn-table at each step, substantially as specified.

24. The combination with the turn-table carrying a series of presses, and provided with ratchet-teeth or projections, the hydraulic cylinder, the piston-rod of which forms a pawl for actuating the turn-table with a step-by-step movement, and a detent for stopping and positioning the turn-table at each step, said detent being set in action by the piston of the hydraulic cylinder, substantially as specified.

25. The combination of the turn-table, its actuating-cylinder and piston-rod pawl, of a second cylinder set into action by a projection on said piston-rod, said second cylinder carrying on its piston-rod a detent-block, the upper surface of which is provided with a steep incline, and a friction-surface, and the turn-table being provided with corresponding cavities, one for each press, and having a steep incline and a friction-surface, said devices being suitably located and connected substantially as specified.

26. The combination with the turn-table and the presses mounted thereon, of the cylinder or cylinders for lifting the presses and the cylinder for actuating the turn-table, the latter being provided with a plunger on its piston and a compression-chamber in its cylinder-head, and the auxiliary small cylinder, connected on one side of its cylinder with the said compression-chamber having its piston connected with mechanism for controlling the flow of actuating fluid to the press-lifting cylinder or cylinders.

27. The mechanism for raising and lowering the table of the cake-forming machine, which consists of the combination with said table, of a hydraulic cylinder, having liquid of a lesser pressure above its piston and liquid of a greater pressure below its piston, a double valve in the pipes supplying the greater pressure for alternately applying and exhausting the greater pressure from below the piston said double valve being actuated by a cam, and also a single valve in said pipe, normally held open to permit the liquid of the greater pressure to flow in either direction, and provided with an actuating-lever for closing it, and means for actuating said lever at a given point in the descent of table by contact therewith, substantially as specified.

28. The combination with the meal-tub provided with an aperture in its bottom, the plunger for forcing the meal through this aperture, the rotating stirrer-arms in the meal-tub, and means for stopping the rotation of the stirrer-arms while the plunger is down, substantially as specified.

29. The combination with the meal-tub in which the cake-forming plunger operates, of the heater or heaters for heating the meal, a conveyer for conveying the meal from the heater to the meal-tub, and a conveyer for returning the overflow, if any, from the meal-tub to the heater, substantially as specified.

30. The combination with the crushing-rolls for crushing the seed, the heater for heating the seed, the meal-tub, means for conveying the crushed seed from the rolls to the heater, means for conveying the crushed seed from the heater to the meal-tub, and means for conveying the overflow of the meal-tub, if any, back to the heater, substantially as specified.

31. The combination with the turn-table and the series of presses carried thereon, of the mechanism for operating the inlet and outlet valves of said presses, consisting of two stationary cam-tracks, one for the inlet and the other for the outlet valves, an arm extending from each of the valves into contact with said track, substantially as specified.

32. A hydraulic oil-press, combined with an inlet-valve acting to control the area of the port for the admission of the pressure fluid, and means for actuating said valve automatically acting to increase the area of said port as the pressing operation progresses, substantially as set forth.

33. The combination in an oil-mill comprising several successively-operated oil-presses mounted on a turn-table with the turn-table, the series of presses thereon, the inlet-valves for the presses, levers for operating said valves by contact with a stationary cam-track, and said cam-track so constructed that it will open the inlet-valve fully long enough to take up the slack of the press and then close it to a narrow aperture until the pressing is finished, and then entirely close the valve, substantially as specified.

34. The combination with the press mounted on a turn-table, its valve operated by a depending lever actuated by a stationary cam-track, of means for adjusting or setting the valve, which consists of a supplementary lever attached to the valve-stem, with means for adjusting the supplementary lever with reference to the depending lever, which latter reaches to the cam-track, substantially as specified.

35. The combination with the series of presses, mounted on the turn-table each being provided with an inlet and outlet valve, the depending levers connected to said valves, the stationary cam-tracks for operating said levers, and means which may be set in operation if desired for preventing the normal flow of liquid-pressure to the press-cylinders by separating the supplemental lever to a greater distance from the depending lever, substantially as specified.

36. The combination with a press mounted on a turn-table, the stationary cam-track for operating the inlet-valve of the press-cylinder, the depending lever riding on the cam-track and swiveled on the valve-stem, the supplementary lever attached to the valve-stem and adjustably supported on the depending lever, the saddle pivoted to the depending lever and forming the seat for the adjusting means between said depending lever and its supplementary lever, and an adjustable tripping device for turning the saddle placed in the path of said saddle as the turn-table moves, substantially as specified.

37. The combination with an oil-press and its hydraulic press-cylinder of the inlet-valve for the press-cylinder, said inlet-valve consisting of a movable part and a fixed part, each perforated by an aperture having a sharp angle and placed together so that when the valve is open these angles will point away from each other, and when closed will point toward each other, whereby the pressure on the oil-cakes may be gradually increased or diminished as desired substantially as specified.

38. The combination with the turn-table and means for lifting and lowering the presses thereon, of the vertical rods, one between each pair of adjacent presses, said rods being secured to the turn-table below and to a stringer-piece above, and guide-arms extending from both sides of each press to said rods, whereby the presses are guided in lifting and lowering them, and the guide-rods are braced by the presses themselves, substantially as specified.

39. The combination of the turn-table carrying the presses, the hydraulic cylinder for moving said turn-table controlled by a valve, and a cam driven by the prime mover of the mill for controlling the action of the valve, substantially as specified.

40. The combination of the turn-table, the hydraulic cylinder for turning it, the hydraulic cylinders for lifting and lowering the presses, the cake-forming plunger, the hydraulic cylinder for operating said plunger, the cake-forming table, the hydraulic cylinder for raising and lowering said table, and the hydraulic cylinder for moving said table and the cake-pan thereon toward the press, and cams driven by the prime mover of the mill for controlling the operation of said several hydraulic cylinders, substantially as specified.

41. The combination with the hydraulic cylinder for operating the turn-table, the hydraulic cylinders for raising and lowering the presses, and the hydraulic cylinders for operating the cake-compressing plunger and the cake-table, of a series of cams driven by the prime mover of the mill, and an interposed counting device which will permit some of the cylinders to be operated more times than the others, substantially as specified.

42. The combination in an oil-mill comprising several successively-operated oil-presses mounted on a turn-table, of the hydraulic cylinder for driving the turn-table, and provided with a compression-chamber and plunger for operating an auxiliary small cylinder by liquid under compression from the compression-chamber, said auxiliary cylinder, a valve operated by said auxiliary cylinder controlling the supply of power to two cylinders for raising and lowering the presses, two supplemental hydraulic cylinders, one connected with each of the raising and lowering cylinders for controlling the lowering operation by discharging measured quantities of the liquid from said cylinders, a cam for each of said supplementary cylinders for controlling the valves thereof, said cams being on a shaft driven by the prime mover of the mill, and a cam on a counter-shaft for controlling the valve which admits liquid-pressure to the cylinder which operates the turn-table, substantially as specified.

43. The combination in an oil-mill comprising several oil-presses mounted on a turn-table, of the hydraulic cylinder for driving the turn-table, and provided with a compression-chamber and plunger for operating an auxiliary small cylinder by liquid under compression from the compression-chamber, said auxiliary cylinder, a valve operated by said auxiliary cylinder controlling the supply of power to two cylinders for raising and lowering the presses, two supplemental hydraulic cylinders, one connected with each of the raising and lowering cylinders for controlling the lowering operation by discharging measured quantities of the liquid from said cylinders, a cam for each of said supplementary cylinders for controlling the valves thereof, said cams being on a shaft driven by the prime mover of the mill, a cam on a counter-shaft for controlling the valve which admits liquid-pressure to the cylinder which operates the turn-table, a compression-chamber in one of the raising and lowering cylinders connected to and operating a second auxiliary cylinder, and a counting mechanism connected to the cam-shaft, and its detent-lever connected to and operated by the piston of the second auxiliary cylinder, substantially as specified.

44. The combination in an oil-mill of apparatus for automatically forming the cakes, apparatus for conveying the cakes to the press, apparatus for discharging them from the press, all operated partly by shafting from the prime mover of the mill and partly by hydraulic cylinders, a prime mover for the mill, a source of hydraulic power, a clutch for throwing the mill-power on and off and a stop-cock for throwing the liquid-pressure on and off, and a single handle which operates both the clutch and the stop-cock, substantially as specified.

ALFRED B. LAWTHER.

Witnesses:
JOHN W. MUNDAY,
H. M. MUNDAY.